United States Patent
Keller et al.

(10) Patent No.: US 11,523,307 B2
(45) Date of Patent: Dec. 6, 2022

(54) NETWORK REPOSITORY FUNCTION IN 5GC

(71) Applicant: Telefonaktiebolaget LM Ericsson (publ), Stockholm (SE)

(72) Inventors: Ralf Keller, Würselen (DE); Jari Vikberg, Järna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 188 days.

(21) Appl. No.: 16/768,529

(22) PCT Filed: Dec. 13, 2017

(86) PCT No.: PCT/SE2017/051266
§ 371 (c)(1),
(2) Date: May 29, 2020

(87) PCT Pub. No.: WO2019/117769
PCT Pub. Date: Jun. 20, 2019

(65) Prior Publication Data
US 2020/0305033 A1    Sep. 24, 2020

(51) Int. Cl.
*H04W 36/00*    (2009.01)
*H04W 84/04*    (2009.01)

(52) U.S. Cl.
CPC ...... *H04W 36/0022* (2013.01); *H04W 84/042* (2013.01)

(58) Field of Classification Search
CPC ........... H04W 36/0022; H04W 84/042; H04W 24/02; H04W 36/14; H04L 67/14; H04L 65/1016; H04L 65/1073
(Continued)

(56) References Cited

U.S. PATENT DOCUMENTS

| | | | |
|---|---|---|---|
| 2011/0013597 A1* | 1/2011 | Hwang | H04W 8/12 455/426.1 |
| 2011/0212723 A1 | 9/2011 | Kunz et al. | |

(Continued)

FOREIGN PATENT DOCUMENTS

CN    103096392 A    5/2013

OTHER PUBLICATIONS

3GPP TS 23.003 V15.1.0, "3rd Generation Partnership Project; Technical Specification Group Core Network and Terminals; Numbering, addressing and identification (Release 15)," Sep. 2017, 109 pages, 3GPP Organizational Partners.

(Continued)

*Primary Examiner* — Michael Y Mapa
(74) *Attorney, Agent, or Firm* — Nicholson De Vos Webster & Elliott LLP

(57) ABSTRACT

A method performed by a first NF service provider in 5GC, for enabling a specific functionality for a specific area of a communications network. The 5GC further comprises one or more second NF service provider managing the specific functionality in the 5GC and a NF service consumer requesting the specific functionality to be performed by the second NF service provider for the specific area. The method comprises obtaining, from the NF service provider, information regarding the functionality and the network area supported. The method further comprises receiving a request for the address of the second NF service provider supporting the functionality in a desired network area. The method further comprises determining the address of the NF service provider supporting the functionality for the network area indicated and sending the determined address to the NF service consumer.

14 Claims, 11 Drawing Sheets

(58) Field of Classification Search
USPC .............. 370/330; 455/404.2, 414.1–414.2, 455/432.1–433, 435.1–444, 456.1–457
See application file for complete search history.

(56) References Cited

U.S. PATENT DOCUMENTS

| | | | |
|---|---|---|---|
| 2013/0100932 A1* | 4/2013 | Yu ........................ | H04W 48/18 370/331 |
| 2015/0006571 A1* | 1/2015 | Varvello ........... | G06F 16/90335 707/770 |
| 2019/0075431 A1* | 3/2019 | Albasheir ............... | H04L 67/52 |

OTHER PUBLICATIONS

3GPP TS 23.216 V15.0.0, "3rd Generation Partnership Project; Technical Specification Group Services and System Aspects; Single Radio Voice Call Continuity (SRVCC); Stage 2 (Release 15)," Sep. 2017, 69 pages, 3GPP Organizational Partners.

3GPP TS 23.401 V15.1.0, "3rd Generation Partnership Project; Technical Specification Group Services and System Aspects; General Packet Radio Service (GPRS) enhancements for Evolved Universal Terrestrial Radio Access Network (E-UTRAN) access (Release 15)," Sep. 2017, 397 pages, 3GPP Organizational Partners.

3GPP TS 23.501 V1.5.0, "3rd Generation Partnership Project; Technical Specification Group Services and System Aspects; System Architecture for the 5G System; Stage 2 (Release 15)," Nov. 2017, 170 pages, 3GPP Organizational Partners.

3GPP TS 23.502 V1.3.0, "3rd Generation Partnership Project; Technical Specification Group Services and System Aspects; Procedures for the 5G System; Stage 2 (Release 15)," Nov. 2017, 215 pages, 3GPP Organizational Partners.

Invitation to Pay Additional Fees for Application No. PCT/SE2017/051266, dated May 18, 2018, 20 pages.

International Search Report and Written Opinion for Application No. PCT/SE2017/051266, dated Jul. 10, 2018, 23 pages.

International Preliminary Report on Patentability for Application No. PCT/SE2017/051266, dated Jun. 25, 2020, 17 pages.

* cited by examiner

NETWORK REPOSITORY FUNCTION IN 5GC

CROSS-REFERENCE TO RELATED APPLICATIONS

This application is a National stage of International Application No. PCT/SE2017/051266, filed Dec. 13, 2017, which is hereby incorporated by reference.

TECHNICAL FIELD

Embodiments herein relate to a first Network Function (NF) service provider, a second NF service provider and an NF service consumer and methods performed therein for managing specific functionality for specific areas of a telecommunications network. Furthermore, a computer program and a computer readable storage medium are also provided herein.

BACKGROUND

In a typical wireless communication network, wireless devices, also known as wireless communication devices, mobile stations, stations (STA) and/or User Equipments (UE), communicate via a Local Area Network such as a WiFi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in 5G. A service area or cell area is a geographical area where radio coverage is provided by the radio network node. The radio network node communicates over an air interface operating on radio frequencies with the wireless device within range of the radio network node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. This type of connection is sometimes referred to as a backhaul connection. The RNCs and BSCs are typically connected to one or more core network nodes and in some cases even to different core networks.

Specifications for the Evolved Packet System (EPS), also called a Fourth Generation (4G) network, have been completed within the 3$^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface. EPS is the Evolved 3GPP Packet Switched (PS) Domain.

In addition to faster peak Internet connection speeds, 5G planning aims at higher capacity than current 4G, allowing higher number of mobile broadband users per area unit, and allowing consumption of higher or unlimited data quantities in gigabyte per month and user. This would make it feasible for a large portion of the population to stream high-definition media many hours per day with their mobile devices, when out of reach of Wi-Fi hotspots. 5G research and development also aims at improved support of machine to machine communication, also known as the Internet of things, aiming at lower cost, lower battery consumption and lower latency than 4G equipment.

Although, high data rates and low latency is becoming increasingly important in most cases, there remains a need to guarantee the quality of active voice calls. As a consequence of the higher data rates, the coverage areas of cells in newer communication technologies are often smaller than for legacy cells. In order to avoid a voice call from being dropped when a UE leaves the coverage area of e.g. a 5G radio access network, which would lead to an unacceptable Quality of Experience (QoE) for the end user, the voice session of the UE may be handed over to a legacy 2G/3G coverage.

Standardization work is ongoing on NG-RAN and 5GC as new radio access and new packet core network, see e.g. 3GPP specifications 23.501 and 23.502 for stage 2.

A Network Repository Function (NRF) have been introduced that supports service and NF discovery towards NFs. An NF is also called a NF Service Producer if the NF supports and produces one or more different services towards other NF, which act as an NF Service Consumer. An NF Service Producer may register the services it supports to the NRF for example when the NF Service Producer is activated for the first time or when a new instance of the NF Service Producer is activated. The NF Service Producer provides information about its NF Type, supported services and address information to the NRF as part of the registration to the NRF and the NRF stores the received information about the NF Service Producer. An NF Service Consumer may query the NRF when it needs to discover an NF Service producer of a specific type or a NF service producer supporting a specific service. The NRF uses the stored information about NF Service Producer(s) and returns the information about queried NF Service Producer(s) to the querying NF Service Consumer. Naturally a particular NF can be both NF Service producer and NF Server Consumer at the same time, but also naturally it makes no sense to be the NF consumer of a service that is offered by itself as NF producer. Such interaction may be handled by an NF internal logic.

SUMMARY

An object of embodiments herein is to provide a method for managing specific functionality for specific network areas which improves the performance and reliability of the communications network in an efficient manner.

According to a first aspect of embodiments herein, the object is achieved by a method performed by a first Network Function (NF) service provider in a 5G core network (5GC), for enabling a specific functionality for a specific area of a communications network. The 5GC further comprises one or more second NF service provider managing the specific functionality in the 5G core network and a NF service consumer requesting the specific functionality to be performed by the second NF service provider for the specific area. The first NF service provider obtains, from the one or more second NF service provider, information regarding the specific functionality supported by the one or more second NF service provider, information regarding network areas which each of the one or more second NF service provider supports the specific functionality for and information regarding the address of each of the one or more second NF service provider. The first NF service provider receives, from the NF service consumer, a request for an address of the one or more second NF service provider supporting the specific functionality in a desired network area. The request comprises a network area information. The network area information indicates the network area for which the specific functionality is desired. The first NF service provider determines the address of the one or more second NF service provider supporting the specific functionality in the network area indicated in the received request, based on the received information from the NF service consumer and the information obtained from the one or more second NF service provider. The first NF service provider sends the determined address of the second NF service provider supporting specific functionality in the indicated network area to the NF service consumer.

According to a second aspect of embodiments herein, the object is achieved by a method performed by an NF service consumer in a 5GC, for requesting a specific functionality to be performed for a specific area of a communications network. The 5GC further comprises a first NF service provider for enabling a specific functionality for the specific area and one or more second NF service provider managing the specific functionality for the specific area. The NF service consumer obtains a request to locate an NF service provider supporting a specific functionality in a specific network area. The request comprises network area information for the area in which the specific functionality is desired to be performed for. The NF service consumer determines, based on the obtained information, that the NF service consumer does not have information regarding a second NF service provider managing the specific functionality configured for or associated to the obtained network area information. The NF service consumer transmits, to the first NF service provider enabling the specific functionality in the specific area, a request for an address of the one or more second NF service provider managing the specific functionality for the specific area. The request comprises a network area information indicating the network area in which the specific functionality shall be performed. The NF service consumer receives, from the first NF service provider, an address of one or more second NF service provider supporting the specific functionality for the indicated network area. The address has been determined based on the network area information comprised in the transmitted request. The NF service consumer invokes the specific functionality by transmitting a message to one of the one or more second NF service provider based on the received address. The message comprises an indication that the specific functionality is to be performed and an indication of the specific network area in which the specific functionality is to be performed.

According to a third aspect of embodiments herein, the object is achieved by a method performed by a second NF service provider in a 5GC, for managing a specific functionality for a specific area of a communications network. The 5GC further comprises a first NF service provider for enabling a specific functionality for the specific area and an NF service consumer requesting the specific functionality to be performed for the specific area. The second NF service provider transmits, to the first NF service provider enabling the specific functionality to be performed, information regarding the specific functionality which the second NF service provider supports, the network areas which the second NF service provider supports the specific functionality in and information regarding the address of the second NF service provider.

According to a fourth aspect of embodiments herein, the object is achieved by a first NF service provider in a 5GC, for enabling a specific functionality for a specific area of a communications network. The 5GC further comprises one or more second NF service provider managing the specific functionality in the 5GC and an NF service consumer requesting the specific functionality to be performed by the second NF service provider for the specific area. The first NF service provider is configured to obtain, from the one or more second NF service provider, information regarding the specific functionality supported by the one or more second NF service provider, information regarding network areas which each of the one or more second NF service provider supports the specific functionality for and information regarding the address of each of the one or more second NF service provider. The first NF service provider is further configured to receive, from the NF service consumer, a request for an address of the one or more second NF service provider supporting the specific functionality in a desired network area. The request comprises a network area information, wherein the network area information indicates the network area for which the specific functionality is desired. The first NF service provider is further configured to determine, based on the received information from the NF service consumer and the information obtained from the one or more second NF service provider, the address of the one or more second NF service provider supporting the specific functionality in the network area indicated in the received request. The first NF service provider is configured to send the determined address of the second NF service provider supporting specific functionality in the indicated network area to the NF service consumer.

According to a fifth aspect of embodiments herein, the object is achieved by an NF service consumer in a 5GC, for requesting a specific functionality to be performed for a specific area of a communications network. The 5GC further comprises a first NF service provider for enabling a specific functionality for the specific area and one or more second NF service provider managing the specific functionality for the specific area. The NF service consumer is configured to obtain a request to locate an NF service provider supporting a specific functionality in a specific network area. The request comprises network area information for the area in which the specific functionality is desired to be performed for. The NF service consumer is configured to determine, based on the obtained information, that the NF service consumer does not have information regarding a second NF service provider managing the specific functionality configured or associated to the obtained network area information. The NF service consumer is further configured to transmit, to the first NF service provider enabling the specific functionality in the specific area, a request for an address of the one or more second NF service provider managing the specific functionality for the specific area. The request comprises a network area information indicating the network area in which the specific functionality shall be performed. The NF service consumer is further configured to receive, from the first NF service provider, an address of one or more second NF service provider supporting the specific functionality for the indicated network area. The address has been determined based on the network area information comprised in the transmitted request. The NF service consumer is further configured to invoke the specific functionality by transmitting a message to one of the one or more second NF service provider based on the received address. The message comprises an indication that the specific functionality is to be performed and an indication of the specific network area in which the specific functionality is to be performed.

According to a sixth aspect of embodiments herein, the object is achieved by a second NF service provider in a 5GC, for managing a specific functionality for a specific area of a communications network. The 5GC further comprises a first NF service provider for enabling a specific functionality for the specific area and an NF service consumer requesting the specific functionality to be performed for the specific area. The method second NF provider is configured to transmit, to the first NF service provider enabling the specific functionality to be performed, information regarding the specific functionality which the second NF service provider supports, the network areas which the second NF service provider supports the specific functionality in and information regarding the address of the second NF service provider.

It is furthermore provided herein a computer program comprising instructions, which, when executed on at least one processor, cause the at least one processor to carry out any of the methods above, as performed by the first NF service provider. It is additionally provided herein a computer-readable storage medium, having stored thereon a computer program comprising instructions which, when executed on at least one processor, cause the at least one processor to carry out the method according to any of the methods above, as performed by the first NF service provider.

It is furthermore provided herein a computer program comprising instructions, which, when executed on at least one processor, cause the at least one processor to carry out any of the methods above, as performed by the NF service consumer. It is additionally provided herein a computer-readable storage medium, having stored thereon a computer program comprising instructions which, when executed on at least one processor, cause the at least one processor to carry out the method according to any of the methods above, as performed by the NF service consumer.

It is furthermore provided herein a computer program comprising instructions, which, when executed on at least one processor, cause the at least one processor to carry out any of the methods above, as performed by the second NF service provider. It is additionally provided herein a computer-readable storage medium, having stored thereon a computer program comprising instructions which, when executed on at least one processor, cause the at least one processor to carry out the method according to any of the methods above, as performed by the second NF service provider.

The embodiments herein reduce the configuration effort in the NF service consumer, which improves the efficiency of the network. The embodiments herein further provides a solution for distributing the responsibility for managing a specific functionality for a specific area of the network to a plurality of second NF service providers, which reduces the stress on each second NF service provider and increase the capacity of each second NF service provider managing the specific functionality. Thereby the performance and the capacity of the communications network may be improved.

BRIEF DESCRIPTION OF THE DRAWINGS

Embodiments will now be described in more detail in relation to the enclosed drawings, in which.

DETAILED DESCRIPTION

The embodiments described herein provide a first NF service provider, such as an NRF, for supporting service and Network Function (NF) discovery towards NFs supporting specific functionality for specific areas of a network both within the 5G core network (5GC) and outside the 5GC.

The existing mechanisms for NF Service Producer and NF service registration and discovery are limited to information about NF type and the services provided by an NF Service Producer. In order to improve the performance and capacity of the NF functions it may be beneficial to provide a plurality of NF Service Producers of the same NF type which support the same services but are supporting any of the services related to a specific network area. One example embodiment used in the current document is SRVCC handover towards a specific part of a legacy core network and legacy radio access network supporting CS domain services. In this example embodiment, multiple SRVCC Functions (SRVCCFs) are supporting the SRVCC handover towards different parts of the legacy core network and legacy radio access network, while both the NF type and the services supported are the same for all SRVCCFs. The currently known mechanisms for NF Service Producer registration towards the NRF and NF Service Producer discovery by an NF Service Consumer from the NRF don't support mechanisms for services that are for a specific network area. It is thus an object of the current embodiments to provide an improved NRF for supporting specific functionality for specific network areas when the specific functionality is managed by a plurality of NF service providers in the communications network.

Figure 1:
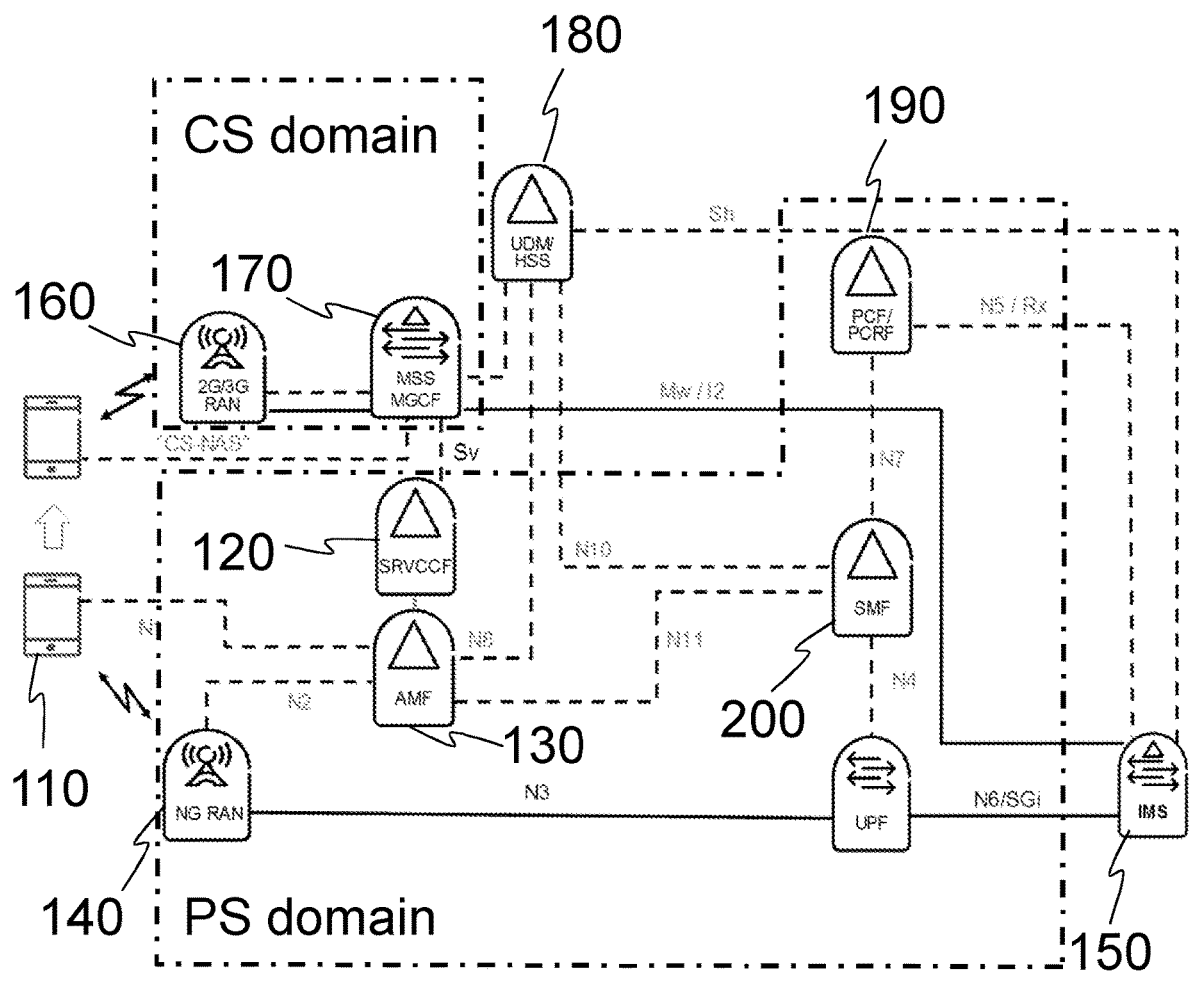
FIG. 1 is a schematic overview depicting an exemplary communication network according to an exemplary network functionality.

Embodiments herein relate to a communication network in general. FIG. 1 is a schematic overview depicting a communication network 100. The communication network 100 comprises a Radio Access Network (RAN) and a Core Network (CN). The communication network 100 may use a number of different technologies, such as Long Term Evolution (LTE), LTE-Advanced, 5G, 2G/3G, CDMA, UTRAN, GERAN, Wideband Code Division Multiple Access (VVCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in both a 5G and an LTE context.

In the communication network 100, wireless devices e.g. a User Equipment (UE) 110 such as a mobile station, a non-access point (non-AP) STA, a STA, a wireless device and/or a wireless terminal, communicate via an Access Network (AN), e.g. a RAN, with the CN. It should be understood by those skilled in the art that an UE is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a base station communicating within a cell.

The communication network 100 comprises a set of radio network nodes, such as radio network nodes 140, 160 each providing radio coverage over one or more geographical areas of a radio access technology (RAT), such as 5G New Radio (NR), LTE, UMTS, GSM, Wi-Fi or similar. The radio network node 140, 160 may be a radio access network node such as a radio network controller or an access point such as a wireless local area network (WLAN) access point or an Access Point Station (AP STA), an access controller, a base station, e.g. a radio base station such as a NodeB, an evolved Node B (eNB, eNodeB), a 5G nodeB (gNB), a base transceiver station, Access Point Base Station, base station router, a transmission arrangement of a radio base station, a stand-alone access point or any other network unit capable of serving a wireless device within the cell, which may also be referred to as a service area, served by the radio network node 140, 160 depending e.g. on the first radio access technology and terminology used. The radio network nodes 140, 160 are comprised in the radio access network (RAN).

The radio network node 140 may be a gNB or an eNB operating in a packet switched (PS) domain of the communications network 100 and the radio network node 160 is a legacy RAN node operating in a circuit switched (CS) domain of the communications network 100.

The overall architecture for an exemplary NF functionality relating to SRVCC handover according to one of the embodiments described herein is shown in FIG. 1. The UE 110 is initially connected to a 5G Core network (5GC) via an NG-RAN 140 (5G RAN) and has an active IP-Multimedia Subsystem (IMS) call, which may also be referred to as a voice session, or connection being anchored in the IMS 150. The 5GC supports NG-RAN that may comprise both LTE eNBs and NR gNBs. There may be a need to move the UE 110 away from 5G to 2G/3G network coverage. This may e.g. be due to the UE 110 leaving 5G coverage. It may however also be due to the fact that the RAN decides to perform a handover due to 2G/3G coverage being better for a voice service, and the operator having either not 4G deployed at all, having 4G deployed but not having deployed IMS 150 in the 4G network or at least not in the current area of the UE 110. One possibility to support IMS call continuity in this scenario, is to move the UE 110 from 5G to 2G/3G using a SRVCC handover procedure. There is however no SRVCC specified between 5G and 2G/3G networks in 3GPP Rel 15. Support for SRVCC handover from 5G, such as from the 5GC and the NG-RAN 140, towards legacy radio accesses having a CS domain, such as 2G/3G radio accesses 160 is thereby introduced. This may be achieved by introducing a network function (NF) service provider 120, such as e.g. a new improved SRVCC Function (SRVCCF), between an NF service consumer 130, such as e.g. the AMF, in 5GC and a Mobile Switching Server (MSS) 170 in the 2G/3G CS CN. The NF service provider 120, such as e.g. the SRVCCF, supports an Sv-interface towards the MSS 170 and a new interface towards the NF service consumer 130, such as the AMF, which may be realized using service based architecture. NF service consumer shall herein be interpreted as an entity or a function requesting a service from another function and NF service provider shall herein be interpreted as an entity or a function providing a service to another entity or function within the communications network 100. The SRVCC handover may be triggered from the NG-RAN 140.

Figure 2:
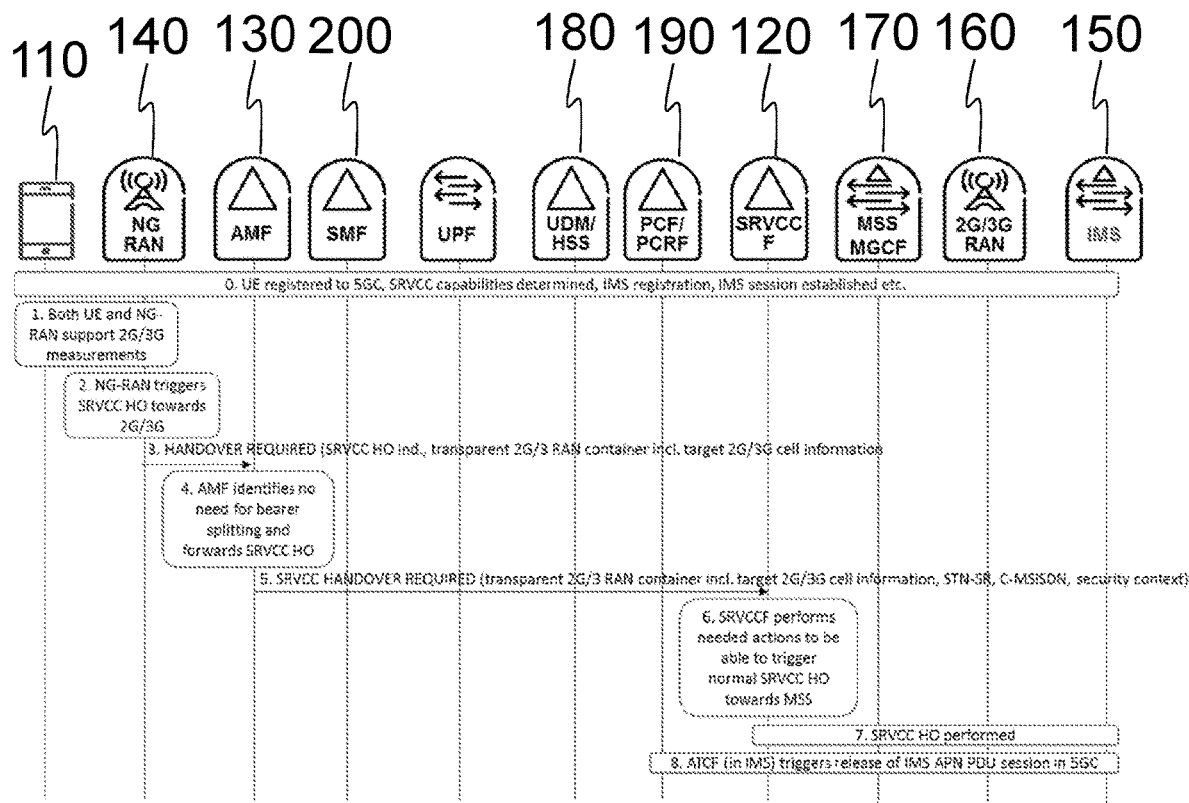
FIG. 2 is a signaling diagram depicting SRVCC handover as an exemplary functionality according to embodiments herein.

FIG. 2 shows a signalling flow for the exemplary NF function relating to SRVCC handover. FIG. 2 is a high-level description of the signalling flow.

The following steps take place in FIG. 2. The prerequisites are that the UE 110 is registered to 5GC, SRVCC capabilities have been determined, which comprises the AMF informing the RAN that SRVCC is possible, and that the UE 110 has an IMS call and/or connection in an active, alerting or pre-alerting state. Or in other words, the UE is in an active and/or connected state in the NG-RAN. This is shown as step 0 in FIG. 2. The rest of the steps are as follows:

1) A radio access node, such as a gNB or an eNB, in the NG-RAN 140 has 2G/3G cells in a neighbor cell list and provides this list to the UE 110. Both the UE 110 and the NG-RAN 140 support 2G/3G measurements, hence SRVCC may be performed.
2) The NG-RAN 140 identifies a need for performing handover of the UE 110 towards a legacy RAN 160, such as e.g. a 2G/3G RAN, and triggers SRVCC handover towards the legacy RAN 160.
3) The NG-RAN 140 sends a HANDOVER REQUIRED message to the NF service consumer 130, such as the AMF, which message comprises a target ID indicating to where the SRVCC handover should be performed.
4) The NF service consumer 130, such as the AMF, identifies the need to perform SRVCC handover towards the legacy network, such as the 2G/3G network. The NF service consumer 130 may select an NF service provider 120 based on the received Target ID or based on a local configuration. The NF service consumer 130 forwards the SRVCC handover request to the NF service provider 120.
5) The NF service consumer 130, such as the AMF, may then send a SRVCC HANDOVER REQUIRED message to the NF service provider 120, such as the SRVCCF.

6) The NF service provider 120 may perform required actions to be able to trigger SRVCC handover of the UE 110 towards the MSS 170. The NF service provider 120 may e.g. select a specific MSS 170, e.g. based on the received Target ID or local configuration.
7) The NF service provider 120 may initiate SRVCC towards the MSS 170, as described in 3GPP Rel-15 TS 23.216 v15.0.0. The basic procedure may correspond to the existing SRVCC over the Sv-interface.
8) An Access Transfer Control Function (ATCF) comprised in the IMS 150 may, after receiving the session transfer request including the STN-SR and switching media, delete the source access leg and thereby the media bearers of the UE session in 5GS.

The solution described above in relation to FIG. 2 assumes that the NF service consumer, in this case the AMF, is able to locate the correct NF service provider, such as the SRVCCF, in a SRVCC handover preparation phase, see steps 4 and 5 in FIG. 2. Different SRVCCFs may however support specific functionality, such as e.g. SRVCC handover, towards different parts of the network, such as e.g. different parts of the 2G/3G network. In order to achieve this the NF service consumer, such as the AMF, may need to be configured with SRVCCF information related to different 2G/3G target areas. Such a configuration of the NF service consumer is very time consuming and requires the NF service consumer to have large storage and processing power. This is especially problematic when the information relates to 2G/3G target information, as this kind of information is not needed in the AMF for any other purpose. It is thus an object of the embodiments herein to minimize the configuration effort in the NF service consumer, such as the AMF, and to provide a more efficient method for providing specific functionality for a specific network area or as e.g. in the embodiment relating to SRVCC handover, directing specific functionality to specific network areas.

The embodiments described herein provide a solution for how the NF service consumer 130 may select the correct NF service provider 122 for handling the specific functionality in the specific area of the communications network 100. According to one example embodiment herein, this may refer to an AMF selecting the correct SRVCCF in a SRVCC handover preparation phase. In order to achieve this a first NF service provider, such as e.g. a Network Repository Function, is introduced in the 5GC. The second NF service provider 122, such as the SRVCCF, registers the specific functionality it supports and the specific network areas it supports the specific functionality for, such as e.g. a SRVCC and SRVCC target information e.g. 2G/3G target network areas and/or PLMN for CS domain, in the first NF service provider 121, such as the NRF. The NF service consumer 130, such as e.g. the AMF, queries the first NF service provider 121, such as e.g. the NRF, for the correct second NF service provider 122 when it receives a request to perform a specific functionality for a specific network area. The query to the first NF service provider 121 may comprise network area information for the specific area for which the specific functionality is to be performed. This network area information may be provided by the NG-RAN. Once the NF service consumer 130, such as the AMF, receives information about the correct second NF service provider 122 from the first NF service provider 121, it continues with invoking the specific functionality towards the second NF service provider 122 indicated from the first NF service provider 121.

In one embodiment herein relating to an SRVCC handover, the NF service consumer 130 may query the first NF service provider 121 for the correct SRVCCF, when it receives a SRVCC handover request and SRVCC target information and optionally a PLMN for CS domain from the NG-RAN. Alternatively, the NF service consumer 130 may query an SRVCCF instance also when having determined the need for SRVCC and may then use this SRVCCF during the SRVCC handover procedure unless the desired network area, such as a 2G/3G target area, is not served by this specific SRVCCF. The query to the first NF service provider 121, such as e.g. the NRF, may contain SRVCC target information or a configured SRVCC target information, and optionally a PLMN for the CS domain as provided by the NG-RAN. Once the AMF receives information about the correct SRVCCF from the first NF service provider 121, it continues with the SRVCC handover preparation towards the SRVCCF indicated from the first NF service provider 121. The SRVCC target information may also comprise of 4G/5G area information, in the case the NG-RAN includes this information in the SRVCC handover request to the AMF.

Figure 3:
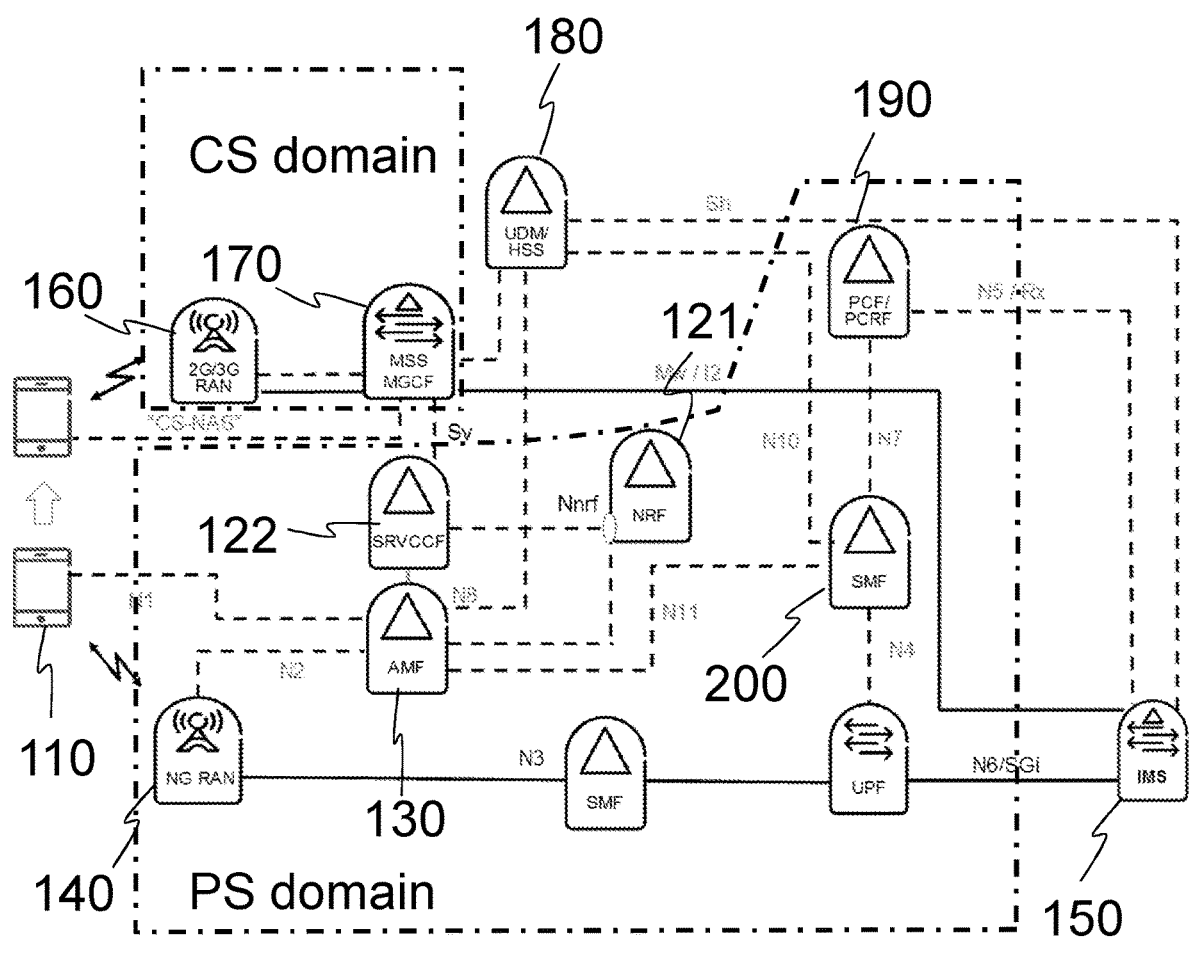
FIG. 3 is a schematic overview depicting a communication network according to the embodiments disclosed herein.
Figure 4:
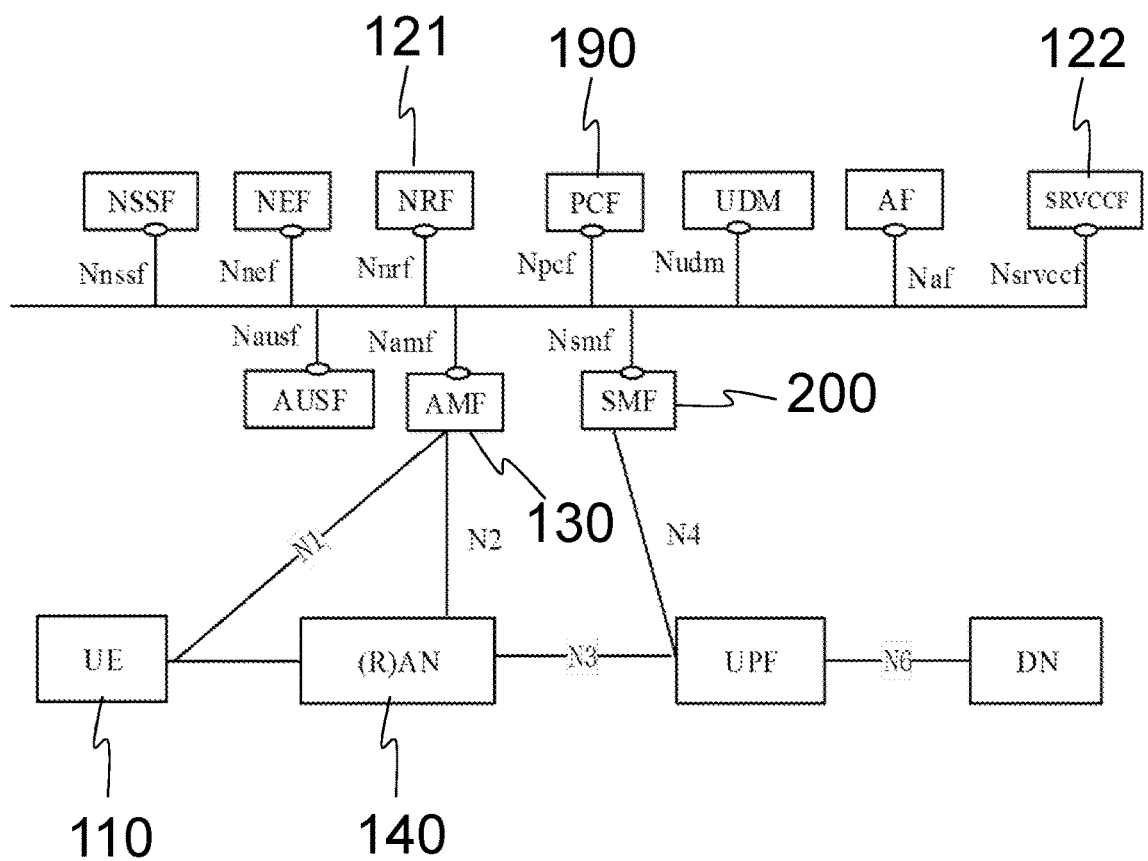
FIG. 4 is a schematic and exemplary overview depicting an overview of a service based architecture in 5GC.

The overall architecture for embodiments disclosed herein is shown in FIG. 3. For better understanding, the embodiments herein are described with reference to an exemplary embodiment describing the SRVCC functionality. It shall however be understood that any specific functionality for a specific area may be handled in the described architecture. The UE 110 is initially connected to the 5GC via 5G RAN (NG-RAN) 140 and has an IMS call in pre-alerting, alerting or active state. In this exemplary embodiment there may be a need to move the UE 110 away from 5G to a legacy network coverage, such as e.g. 2G/3G network coverage. This may be due to e.g. the UE 110 leaving 5G coverage or that the RAN decides that the legacy network coverage is better for voice service and that the operator has either not 4G deployed at all or has 4G deployed but has not deployed IMS in the 4G network or at least not in the current area. The functionality described above in relation to FIGS. 1 and 2 introduces an NF service provider in the form of an SRVCCF, to support SRVCC handover from 5G to 2G/3G networks. The NF service provider is located between an AMF in 5GC and an MSS in the 2G/3G CS CN. The NF service provider supporting SRVCC handover supports Sv-interface towards the MSS and a new interface towards the AMF, which may be realized using service based architecture. According to this exemplary embodiment the specific functionality, such as the SRVCC HO, is triggered from NG-RAN and the embodiments disclosed herein provides a solution to how the NF service consumer, such as the AMF, may locate the correct NF service provider, such as e.g. the correct SRVCCF. According to the embodiments disclosed herein an additional NF service provider 121 for enabling a specific functionality for a specific network area is introduced, which hereinafter is referred to as the first NF service provider is introduced. The first NF service provider 121 for enabling the specific functionality for the specific network area may e.g. be a Network Repository Function (NRF). FIG. 3 shows the first NF service provider 121 as an NRF that provides an Nnrf service based interface towards other network functions (NF). An overview of an exemplary service based architecture is shown in FIG. 4. According to the embodiments disclosed herein both the second NF service provider 122, such as. e.g. the SRVCCF and the NF service consumer 130, such as the AMF, are connected to the first NF service provider, such as the NRF, and uses the first NF service provider 121 for the purpose of enabling the NF service consumer 130 to locate the correct second NF service provider 122 for performing the specific functionality, such as e.g. the SRVCC handover, towards a specific target area, such as e.g. a 2G/3G network area.

FIG. 4 shows the service based 5G system architecture as specified in 3GPP Rel-15 TS 23.501 v1.5.0 and TS 23.502 v1.3.0, as can be seen the first NF service provider 121, such as e.g. the NRF, is connected to the architecture via the Nnrf service based interface, the second NF service provider 122, such as e.g. the SRVCCF, is connected to the architecture via an Nsrvccf service based interface and the NF service consumer 130, such as e.g. the AMF, is connected to the architecture via an Namf service based interface, allowing them to communicate with each other.

Figure 5:
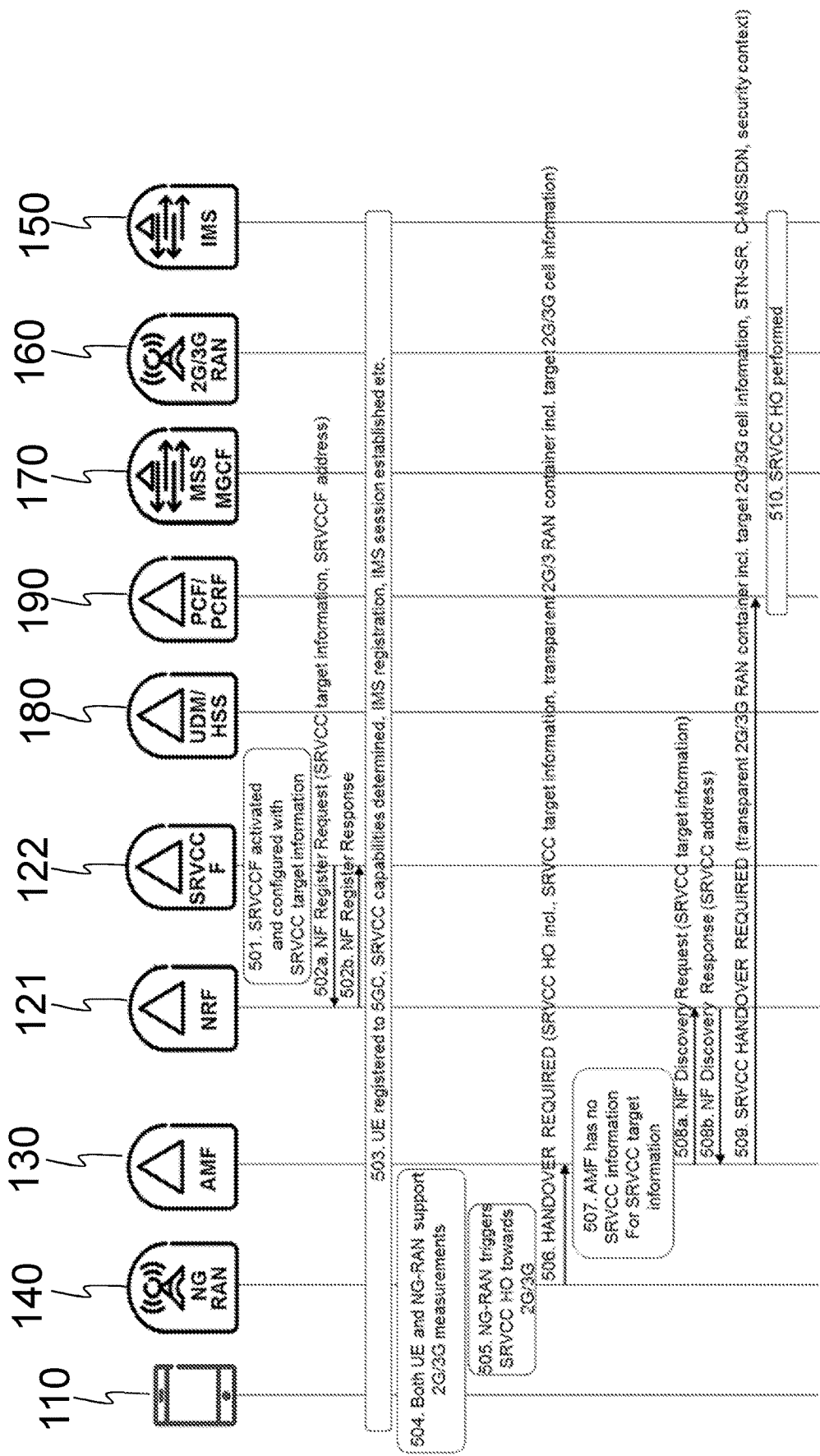
FIG. 5 is a signaling diagram depicting an exemplary embodiment disclosed herein for performing a specific functionality in a specific network area.

FIG. 5 shows an exemplary signaling flow for the embodiments disclosed herein. The different actions are described with reference to the exemplary embodiment in which the specific functionality is an SRVCC handover from a 5G network to a legacy 2G/3G network. It is also worth to highlight that FIG. 5 is a high-level description and the textual description contains the description of multiple different embodiments.

The following actions take place in FIG. 5.

501) The second NF service provider 122, such as the SRVCCF, is configured with information about the specific functionality it supports and the specific network areas for which it supports the specific functionality, which may be referred to as network area information. In the disclosed embodiment the second NF service provider 122 is configured with information about legacy 2G/3G network areas to which it supports SRVCC handover to. The network area information may herein also be referred to as target information, which in the exemplary embodiment may also be referred to as SRVCC target information.
  a. The target information may for example be one or more target RNC-IDs for 3G target network areas, comprising also LAI and RNC-ID. It may also be one or more Cell Global Identities (CGI) for 2G target network areas, comprising PLMN-ID, LAC and Cell identity. In addition, it may also be for example only a subset of the above, e.g. only one or more LAIs comprised for 3G target network areas, only one or more PLMN-IDs comprised in the LAI for 3G target network areas and/or only one or more PLMN-IDs or one or more PLMN-IDs and LACs comprised in the CGI for 2G target network areas. The PLMN-ID may in some embodiments herein be a PLMN for a CS domain of a legacy network.
  b. The target information may also be defined using 4G and 5G network area information, for example using Tracking Area Information (TAIs).

502) The second NF service provider 122, such as e.g. the SRVCCF, registers the specific functionality it supports, its address and supported network area information, i.e. for which specific network areas the specific functionality is supported for, in the first NF service provider 121, such as e.g. the NRF. The network area information may e.g. be a target network area. The second NF service provider may perform the registration by sending 502a a message comprising the information to the first NF service provider 121 using an NF Register Request primitive. The first NF service provider 121, such as e.g. the NRF, replies by sending 502b a response message using an NF Register Response primitive. The second NF service provider may further register a PLMN or PLMN for the CS domain.

503) In the exemplary embodiment relating to SRVCC the UE 110 is registered to 5GC, and specific capabilities, such as SRVCC capabilities, have been determined. This may include the NF service consumer 130, such as e.g. the AMF, informing the RAN 140 that the specific functionality, such as e.g. SRVCC, is possible. In the exemplary embodiment relating to SRVCC it may further inform the RAN that it has an IMS call/connection in an active, alerting or pre-alerting state, i.e. the UE 110 is also in active/connected state in the NG-RAN. Not shown in the call flow: Already in this step the NF service consumer 130, such as the AMF, may interact with the first NF service provider 121, such as e.g. the NRF, to find an SRVCCF instance, using a configured SRVCC target information.

504) A gNB or eNB in the NG-RAN may have legacy cells, such as 2G/3G cells, in the neighbor cell list and provides this list to the UE 110 when
  a. both the UE 110 and the NG-RAN support legacy, such as e.g. 2G/3G, measurements, and
  b. the NF service consumer 130, such as the AMF, has informed the RAN 140 that the specific functionality, in this exemplary embodiment the SRVCC, is possible, when the STN-SR and C-MSISDN have been received from UDM/HSS.

505) The NG-RAN 140 identifies a need to perform the specific functionality for a specific network area, such as the need to handover the UE 110 towards 2G/3G RAN, and triggers activation of the specific functionality for the specific network area, such as e.g. the SRVCC handover towards the legacy 2G/3G network. In the specific embodiment relating to SRVCC, the NG-RAN 140 may build a transparent RAN container needed in the target 2G/3G RAN side, which may also be known as a "Source to Target Transparent Container".

506) The NF service consumer 130 obtains a request to perform the specific functionality for a specific network area. The request comprises network area information for the area in which the specific functionality is desired to be performed. The request may further comprise an indication of the specific functionality to be performed. In the exemplary embodiment relating to SRVCC handover, the NG-RAN 140 sends a HANDOVER REQUIRED message to the NF service consumer 130, such as e.g. the AMF. The message may comprise an SRVCC indication indicating that SRVCC is the specific functionality to be performed, a transparent RAN container having e.g. legacy cell information comprised in the container, and SRVCC target information and optionally PLMN for CS domain indicating where the handover should be routed (mainly by the NF service consumer 130).
  a. The SRVCC target information may for example be an RNC-ID for 3G target network areas comprising also LAI and RNC-ID. It may also be a CGI for 2G target network areas comprising LAI and Cell identity. In addition, it may also comprise for example only a subset of the above, e.g. only the LAI or only the PLMN for CS domain.
  b. The SRVCC target information may also be defined using 4G and 5G network area information, for example using TAIs. In this case the NG-RAN 140 would use 4G and 5G network area information to assist the NF service consumer, such as the AMF, to locate the second NF service provider 122, such as the SRVCCF. The NG-RAN 140 may select this information for example based on mapping between the real 2G/3G target to 4G/5G TAIs or based on UE measurements on 4G/5G cells.

507) The NF service consumer 130, such as e.g. the AMF, detects, which may herein also be referred to as determines, that it has no information regarding a second NF service provider 122 managing the specific functionality configured or associated with the received network area information or target information. In the exemplary embodiment it may detect that it has no SRVCCF information configured or associated for the received SRVCC target information and, if provided, PLMN for CS domain or that an already available SRVCCF does not serve the right target.

a. The NF service consumer 130 may check stored associations between network area information and addresses of the second NF service provider, when detecting that there is no Second NF service provider 122 information available for the received network area information. In the exemplary embodiment the NF service consumer 130 may check stored associations between the SRVCC target information and SRVCCF address (see step 508*d*) when detecting that there is no SRVCCF information available for the received SRVCC target information.

b. If a stored association is detected, then the NF service provider 130 may attempt to use the stored second NF service provider address associated with the received network area information for the specific functionality and may continue to action 509. In the exemplary embodiment relating to SRVCC, the NF service provider 130, such as e.g. the AMF, may attempt to use the SRVCCF address associated with the received SRVCC target information for the SRVCC handover and continue in action 509.

c. If no configured or stored association for the received network area information, such as e.g. SRVCC target information is found, the NF service consumer 130, such as e.g. the AMF, performs action 508.

508) The NF service consumer 130, such as the AMF, queries the first NF service provider 121, such as the NRF, to retrieve the correct second NF service provider 122 for the specific functionality for the specific network area, such as e.g. the SRVCC handover. The NF service consumer 130 may use a NF Discovery Request towards the first NF service provider 121 and includes network area information, such as e.g. SRVCC target information and, if provided, PLMN or PLMN for CS domain, as the main input. The first NF service provider, such as the NRF, returns the address of the one or more second NF service provider 122 supporting the specific functionality for the specific network area, such as e.g. an SRVCCF address, in an NF Discovery Response.

a. The first NF service provider 121 may perform either a partial or a full match to find the correct second NF service provider 122 based on the received network area information, such as e.g. SRVCC target information and if provided, PLMN or PLMN for CS domain.

b. An example of the full match is that the first NF service provider 121 finds a second NF service provider based on the complete network area information, which may e.g. be a target RNC-ID for a 3G target network area or a CGI for 2G target network areas. In the example embodiment relating to SRVCC the full match may be that the first NF service provider finds a SRVCCF based on the complete SRVCC target information, either target RNC-ID for 3G target network areas or a CGI for 2G target network areas.

c. An example of the partial match is that the first NF service provider 121 only has a second NF service provider 122 registered for a specific part of the network area information. The partial match may be a longest match i.e. that the first NF service provider 121 identifies a second NF service provider based on the most matching information elements in the network area information. In the example embodiment relating to SRVCC the partial match may be that the first NF service provider 121 only has a SRVCCF registered for the PLMN for CS domain. The partial match may be the longest match i.e. that the first NF service provider 121 identifies a SRVCCF based on the most matching information elements in the SRVCC target information.

d. When the NF service consumer 130, such as the AMF, receives the second NF service provider 122 address for a specific network area information, such as e.g. SRVCC target information, it may store the address and associate it with the network area information. This may be useful for later activation of specific functionality, such as e.g. SRVCC handovers, towards the same specific network area as the NF service consumer 130 may thereby avoid the interaction with the first NF service provider 121.

509) The NF service consumer 130 invokes the specific functionality by transmitting a message to the address of one of the one or more second NF service provider 122 received from the first NF service provider 121. In the exemplary embodiment related to SRVCC the NF service consumer 130 may create a SRVCC HAN DOVER REQUIRED message and may route it to the SRVCCF address received from the first NF service provider 121, such as the NRF.

510) The second NF service provider 122 performs the necessary actions to perform the specific functionality in the specific network area. In the exemplary embodiment related to SRVCC the second NF service provider executes the SRVCCF handover. The second NF service provider 122, such as e.g. the SRVCCF, performs needed actions to be able to trigger SRVCC handover towards the MSS 170.

The example embodiment herein relating to the SRVCC handover has the benefit that the SRVCC handover from 5G to 2G/3G is improved by minimizing the need to configure any SRVCC target network information for SRVCC handover in the NF service consumer 130, such as the AMF. Furthermore, there is no need to have a single second NF service provider 121, such as e.g. the SRVCCF, serving the whole PLMN, i.e., having configured all details for the whole PLMN.

Figure 6:
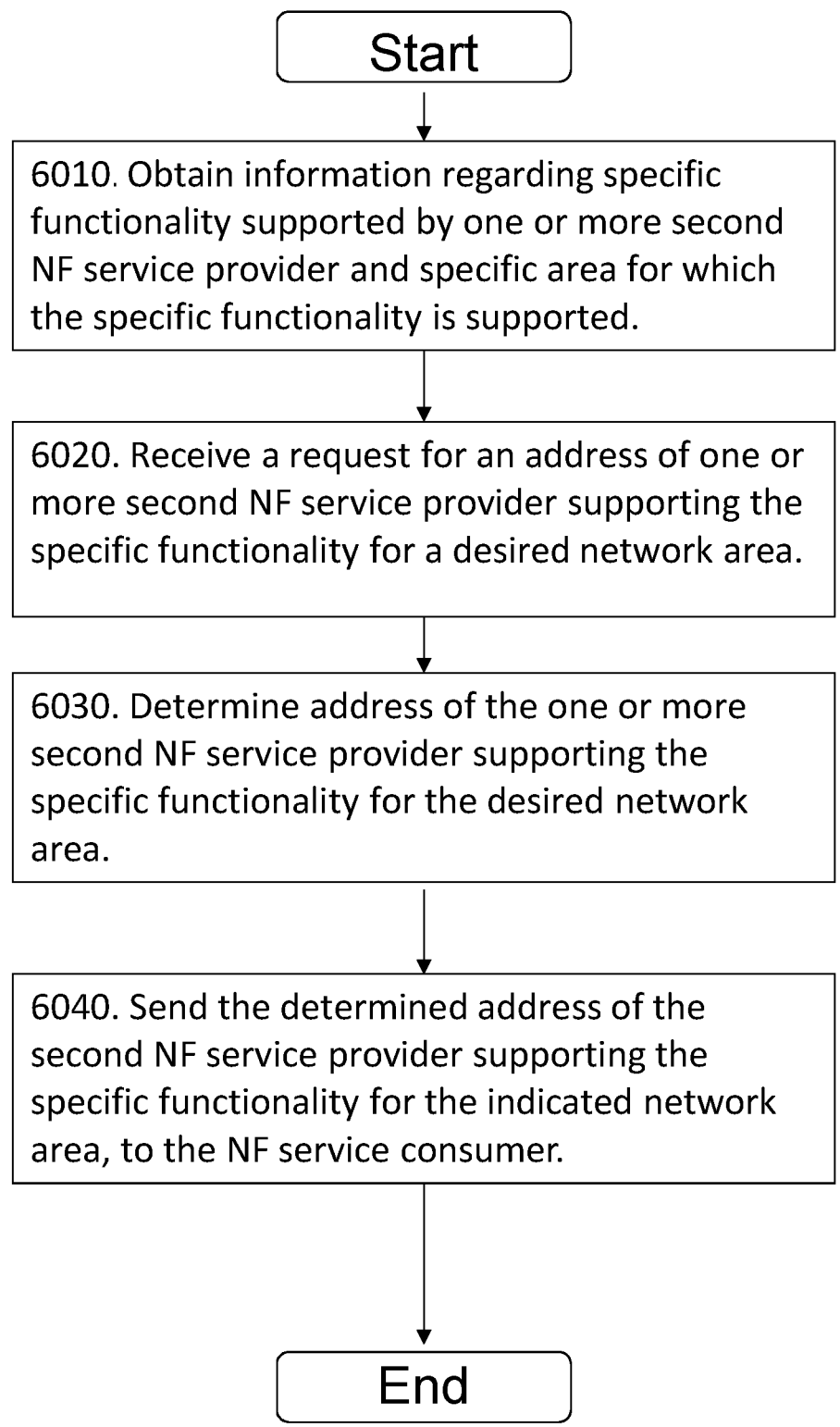
FIG. 6 is a flowchart depicting a method performed by a first NF service provider according to embodiments herein.

The method actions performed by the first NF service provider 121 for enabling a specific functionality for a specific area of the communications network according to embodiments herein, will now be described with reference to a flowchart depicted in FIG. 6. The first NF service provider 121 is comprised in the 5GC. The 5GC further comprises one or more second NF service provider 122 managing the specific functionality in the 5G core network and a NF service consumer 130 requesting the specific functionality to be performed by the second NF service provider 122 for the specific area. In some embodiments the specific area may be related to a CS domain of a legacy core network and/or a legacy radio access network. In further embodiments the specific area may however also be related to different parts of the 5G network, for example for different parts of NG-RAN and/or 5GC. The first NF Service provider 121 may be a Network Repository Function (NRF) located in the 5GC. The actions do not have to be taken in the order stated below, but may be taken in any suitable order. Actions performed for some embodiments only are marked with dashed boxes.

Action 6010: The first NF service provider 121 obtains information regarding the specific functionality supported by the one or more second NF service provider 122, information regarding network areas for which each of the one or more second NF service provider 122 supports the specific functionality for and information regarding the address of each of the one or more second NF service provider 122 from the one or more second NF service provider 122.

This action 6010 is similar to the action 502*a* as described in relation to FIG. 5.

Action 6020: The first NF service provider 121 receives a request for an address of the one or more second NF service provider 122 supporting the specific functionality for a desired network area from the NF service consumer 130. The request comprises a network area information, which network area information indicates the network area for which the specific functionality is desired for. This is similar to the main embodiment of action 508 described in relation to FIG. 5.

In some embodiments the request received from the NF service consumer 130 may comprise an indication of a Public Land Mobile Network (PLMN) in the communications network, for which PLMN the specific functionality is to be performed. The indication of the PLMN may be an indication of a PLMN of the CS domain in a legacy core network and legacy radio access network of the communications network, for which the specific functionality is to be performed for. This is similar to the preamble of action 508 described in relation to FIG. 5.

The request received from the NF service consumer 130 may further comprise an area identifier for identifying the desired network area. An area identifier shall herein be interpreted as one or more area identifier. The area identifier may be received instead of or in addition to the indication of the PLMN. The area identifier may e.g. be a Tracking Area Identity (TAI), a Location Area Identification (LAI), a Routing Area Identity (RAI), a RAN node identity, such as e.g. a BSC-ID, a RNC-ID, an eNB-ID, a gNB-ID, and/or a cell-identity.

Action 6030: The first NF service provider 121 determines the address of the one or more second NF service provider 122 supporting the specific functionality for the network area indicated in the received request, based on the received information from the NF service consumer 130 and the information obtained from the one or more second NF service provider 122.

The first NF service provider 121 may determine the address of the one or more second NF service provider 122 supporting the specific functionality for the desired network area by finding one or more second NF service provider 122 which partially match the target network information, the PLMN and/or the area identifier received from the NF service consumer 130. The determining may further comprise selecting the one or more second NF service provider 122 which have the most information elements matching the target network information, the PLMN and/or the area identifier. This embodiment is similar to the action 508*a* and 508*c* described in relation to FIG. 5.

In some embodiments the first NF service provider 121 may determine the address of the second NF service provider 122 supporting the specific functionality for the desired network area by finding one or more second NF service provider 122 which match the complete target information, the PLMN and/or the area identifier received from the NF service consumer 130. This embodiment is similar to the action 508*a* and 508*b* described in relation to FIG. 5.

Action 6040: The first NF service provider 121 sends, which may also be referred to as transmits, the determined address/addresses of the one or more second NF service provider 122 supporting specific functionality for the indicated network area, to the NF service consumer 130.

This action 6040 is similar to the preamble of action 508 described in relation to FIG. 5.

In one embodiment disclosed herein, the specific functionality may be the SRVCC handover for the User Equipment (UE) 110 having a voice session anchored in an IP-Multimedia Subsystem (IMS) 150 in a packet switched (PS) domain in the 5GC and in a 5G radio access network (NG-RAN). The specific area may be the CS domain of the legacy core network and/or radio access network. Hence, the SRVCC handover may move the voice session to the CS domain in the legacy core network and radio access in the communications network.

Figure 7:
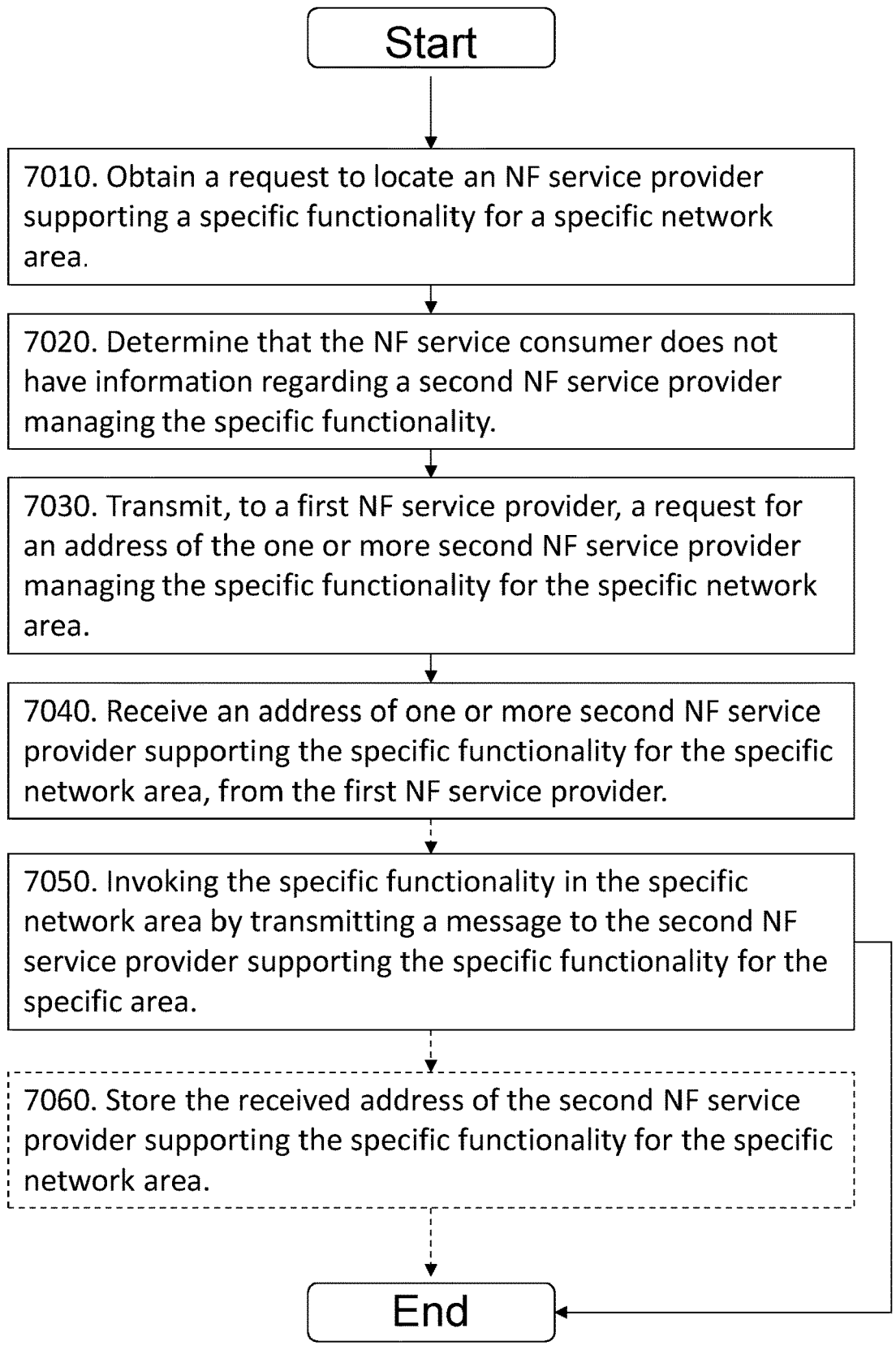
FIG. 7 is a flowchart depicting a method performed by an NF service consumer according to embodiments herein.

The method actions performed by the NF service consumer 130 for requesting a specific functionality to be performed for a specific area of a communications network according to embodiments herein, will now be described with reference to a flowchart depicted in FIG. 7. The NF service consumer 130 is comprised in a 5GC. The 5GC further comprises a first NF service provider 121 for enabling a specific functionality for the specific area and one or more second NF service provider 122 for managing the specific functionality for the specific area. The NF Service consumer may be an Access and Mobility Management Function (AMF) located in the 5GC. The specific area may be the CS domain of the legacy core network and/or radio access network.

The actions do not have to be taken in the order stated below, but may be taken in any suitable order. Actions performed in some embodiments only are marked with dashed boxes.

Action 7010: The NF service consumer 130 obtains a request to locate an NF service provider 122, which NF service provider supports a specific functionality for a specific network area of the communication network 100. The request comprises network area information for the area in which the specific functionality is desired to be performed for. The request may be obtained from a node in the 5G RAN 140.

This action 7010 is similar to the action 506 described in relation to FIG. 5.

Action 7020: The NF service consumer 130 determines, based on the obtained information, that the NF service consumer 130 does not have information regarding a second NF service provider 122 managing the specific functionality configured or associated to the obtained network area information.

This action 7020 is similar to action 507 described in relation to FIG. 5.

Action 7030: The NF service consumer 130 transmits, to the first NF service provider 121 enabling the specific functionality for the specific network area, a request for an address of the one or more second NF service provider 122 managing the specific functionality for the specific area. The request comprises a target network information indicating the network area for which the specific functionality shall be performed for. The request may further comprise an indication of the specific functionality.

The request transmitted to the first NF service provider 121 may further comprise an indication of the PLMN in the core and radio access network of the communications network, which the specific functionality is to be performed for. The indication of the PLMN may in some embodiments be an indication of a PLMN of the CS domain in a legacy core network and legacy radio access network of the communications network, which the specific functionality is to be performed for.

The request transmitted to the first NF service provider 121 may further comprise an area identifier for identifying the desired network area. The area identifier may be received instead of or in addition to the indication of the PLMN. The area identifier may e.g. be a Tracking Area Identity (TAI), a Location Area Identification (LAI), a Routing Area Identity (RAI), a RAN node identity, such as e.g. a BSC-ID, a RNC-ID, an eNB-ID, a gNB-ID, and/or a cell-identity.

This action 7030 is similar to action 508, especially 508b described in relation to FIG. 5.

Action 7040: The NF service consumer 130 receives an address of one or more second NF service provider 122 supporting the specific functionality for the indicated network area, from the first NF service provider 121. The address has been determined by the first NF service provider based on the target network information comprised in the transmitted request.

This action 7040 is similar to action 508 described in relation to FIG. 5.

Action 7050: The NF service consumer 130 invokes the specific functionality for the specific network area by transmitting, based on the received address, a message to one of the one or more second NF service provider 122 supporting the specific functionality for the specific area. The message comprises an indication that the specific functionality is to be performed and an indication of the specific network area for which the specific functionality is to be performed.

This action 7050 is similar to the action 509 described in relation to FIG. 5.

Action 7060: In some embodiments, the NF service consumer 130 may store the received address of the second NF service provider 122 supporting the specific functionality for the specific network area, which has been determined based on the target network information comprised in the transmitted request. The NF service consumer 130 may further associate the target network information to the received address. Thereby, the NF service consumer may obtain the address of the second NF service provider 122 supporting the specific functionality for the specific network area without requesting the address from the first service provider 121 if several instances of the specific functionality are to be performed within a limited time frame. Thereby the amount of data transmitted and the latency for receiving the address may be reduced. The stored addresses may be stored for a limited amount of time only. Thereby the risk that the stored data will be obsolete may be reduced, since the NF service consumer will update the stored addresses regularly by requesting them from the first NF service provider when they are not found in the storage.

This action 7060 is similar to action 508, especially 508d described in relation to FIG. 5.

In some embodiments herein, the specific functionality may be an SRVCC handover for a UE 110 having a voice session anchored in the IMS 150 in the PS domain in the 5GC and in the NG-RAN. The SRVCC handover moves the voice session to a CS domain in a legacy core network and radio access in a communications network. In this embodiment the step of obtaining 7010 may comprise obtaining, from a node in the 5G radio access network 140, a message comprising an indication that the SRVVC handover is to be prepared for the specific area of the communications network and a target network information of the specific area of the communications network. The target network information indicates where in the legacy core network the second NF service provider 122, such as the SRVCCF, should forward the handover to. The specific area may be the CS domain of the legacy core network and/or radio access network.

Figure 8:
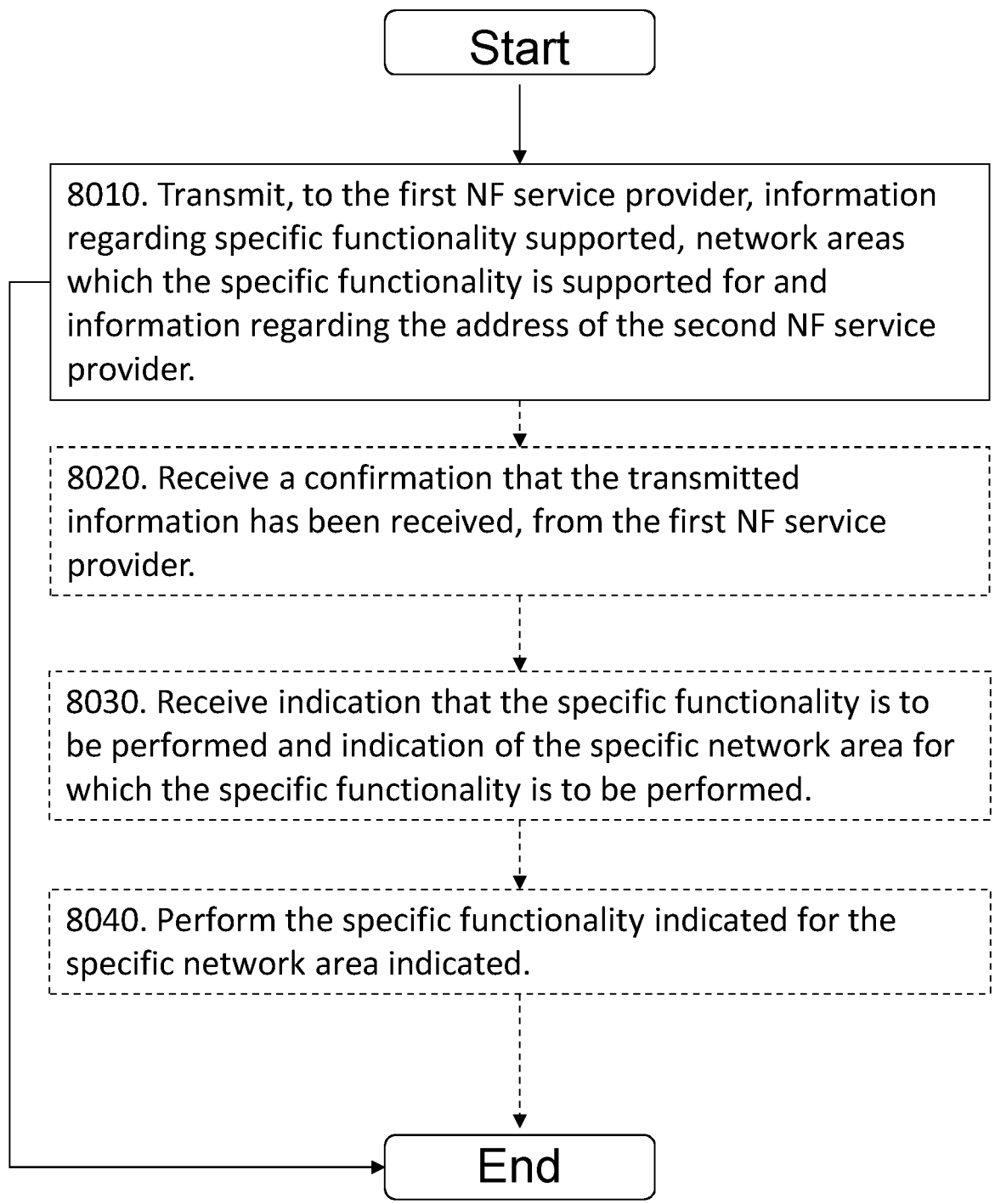
FIG. 8 is a flowchart depicting a method performed by a second NF service provider according to embodiments herein.

The method actions performed by the second NF service provider 122 for managing a specific functionality for a specific area of a communications network according to embodiments herein, will now be described with reference to a flowchart depicted in FIG. 8. The second NF service provider 122 is comprised in the 5GC. The 5GC further comprises a first NF service provider 121 for enabling a specific functionality for the specific area and an NF service consumer (130) requesting the specific functionality to be performed for the specific area. The second NF Service provider 122 may be a Single Radio Voice Call Continuity Function (SRVCCF) located in the 5GC. The specific area may be a CS domain of a legacy core network and/or radio access network. The actions do not have to be taken in the order stated below, but may be taken in any suitable order. Actions performed in some embodiments only are marked with dashed boxes.

Action 8010: The second NF service provider 122 transmits, to the first NF service provider 121, information regarding the specific functionality which the second NF service provider 122 supports, the network areas which the second NF service provider 122 supports the specific functionality for and information regarding the address of the second NF service provider 122.

This action 8010 is similar to the action 502a described in relation to FIG. 5.

Action 8020: The second NF service provider 122 may receive, from the first NF service provider 121, a confirmation that the transmitted information regarding the specific functionality which the second NF service provider 122 supports, the network areas which the second NF service provider 122 supports the specific functionality for and information regarding the address of the second NF service provider 122 has been received.

This action 8020 is similar to action 502b described in relation to FIG. 5. Action 8030: The second NF service provider 122 may further receive an indication that the specific functionality is to be performed and an indication of the specific network area for which the specific functionality is to be performed from the NF service consumer 120.

The indication of the specific network area received from NF service provider 121 may further comprise an indication of the PLMN in the core and radio access network of the communications network, which the specific functionality is to be performed for. The indication of the PLMN may in some embodiments be an indication of a PLMN of the CS domain in a legacy core network and legacy radio access network of the communications network, which the specific functionality is to be performed for.

The indication of the specific network area received from NF service provider 121 may further comprise an area identifier for identifying the desired network area. The area identifier may be received instead of or in addition to the indication of the PLMN. The area identifier may e.g. be a Tracking Area Identity (TAI), a Location Area Identification (LAI), a Routing Area Identity (RAI), a RAN node identity, such as e.g. a BSC-ID, a RNC-ID, an eNB-ID, a gNB-ID, and/or a cell-identity.

This action 8030 is similar to action 509 described in relation to FIG. 5.

Action 8040: The second NF service provider 122 may further perform the specific functionality indicated by the NF service consumer 130 for the specific network area indicated by the NF service consumer 130.

This action 8040 is similar to action 510 described in relation to FIG. 5.

In some embodiments herein, the specific functionality may be an SRVCC handover for a UE 110 having a voice session anchored in the IMS 150 in the PS domain in the 5GC and in the NG-RAN. The SRVCC handover moves the voice session to a CS domain in a legacy core network and radio access in a communications network. In this embodiment the step of obtaining 6010 may comprise obtaining, from a node in the 5G radio access network 140, a message comprising an indication that the SRVVC handover is to be prepared for the specific area of the communications network and a target network information of the specific area of the communications network. The target network information indicates where in the legacy core network the second NF service provider 122, such as the SRVCCF, should forward the handover to. The specific area may be the CS domain of the legacy core network and/or radio access network.

Figure 9:
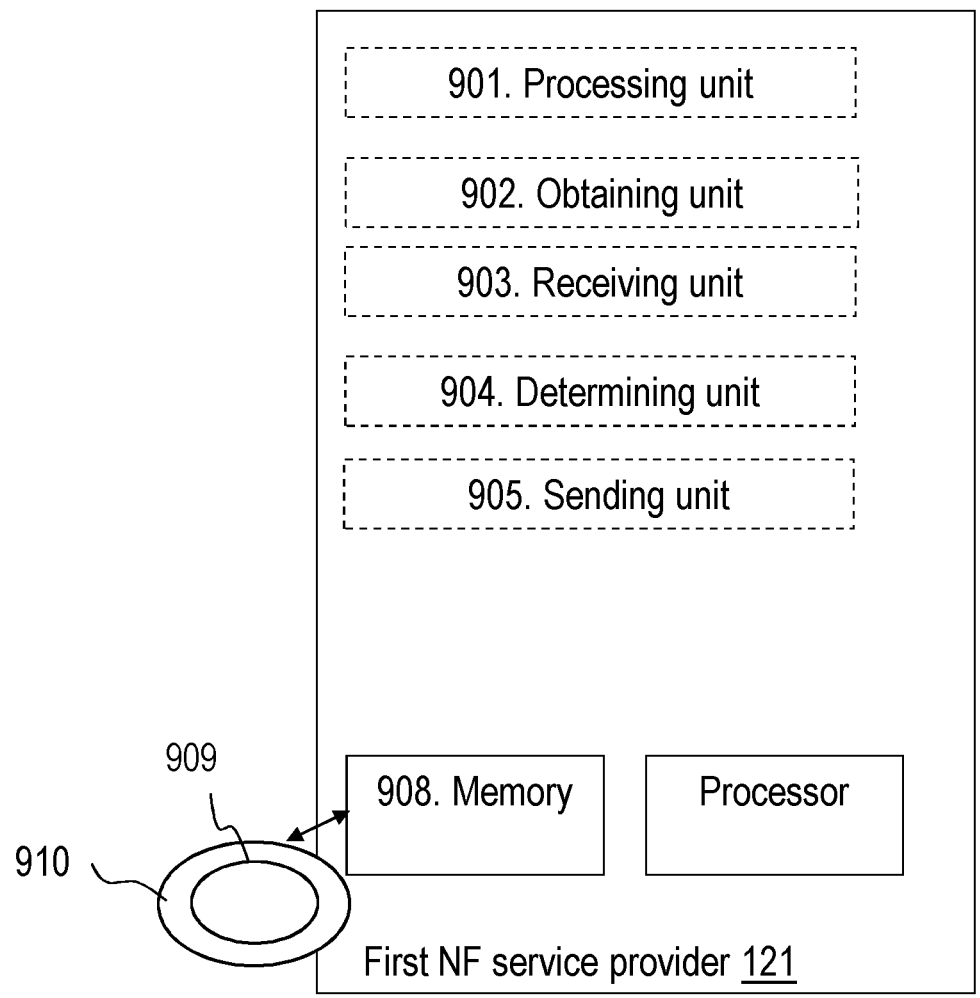
FIG. 9 is a block diagram depicting a first NF service provider according to embodiments herein.

FIG. 9 is a block diagram depicting the first NF service provider 121 in the 5GC, for enabling a specific functionality for a specific area of the communications network 100. The 5GC further comprises one or more second NF service provider 122 managing the specific functionality in the 5GC and an NF service consumer 130 requesting the specific functionality to be performed by the second NF service provider 122 for the specific area. The first NF Service provider 121 may be a Network Repository Function, NRF, located in the 5GC. In some embodiments, the specific functionality may be an SRVCC handover for a UE 110 having a voice session anchored in an IMS 150 in a PS domain in the 5G core network and in a 5G radio access network, wherein the SRVCC handover moves the voice session to a CS domain in a legacy core network and radio access in a communications network. In some embodiments the specific area may be related to a CS domain of a legacy core network and/or radio access network. The first NF service provider 121 may comprise a processing unit 901, such as e.g. one or more processors, an obtaining unit 902, a receiving unit 903, a determining unit 904, and a sending unit 905 as exemplifying hardware units configured to perform the methods described herein.

The first NF service provider 121, the obtaining unit 902 and/or the processing unit 901 is configured to obtain, from the one or more second NF service provider 122, information regarding the specific functionality supported by the one or more second NF service provider 122, information regarding network areas for which each of the one or more second NF service provider 122 supports the specific functionality for and information regarding the address of each of the one or more second NF service provider 122.

The first NF service provider 121, the receiving unit 903 and/or the processing unit 901 is configured to receive, from the NF service consumer 130, a request for an address of the one or more second NF service provider 122 supporting the specific functionality in a desired network area. The request comprises a network area information, which indicates the network area for which the specific functionality is desired.

The first NF service provider 121, the determining unit 904 and/or the processing unit 901 is configured to determine, based on the received information from the NF service consumer 130 and the information obtained from the one or more second NF service provider 122, the address of the one or more second NF service provider 122 supporting the specific functionality for the network area indicated in the received request.

The first NF service provider 121, the sending unit 905 and/or the processing unit 901 is configured to send the determined address of the second NF service provider 122 supporting specific functionality for the indicated network area to the NF service consumer 130.

The first NF service provider 121, the receiving unit 903 and/or the processing unit 901 may further be configured to receive an indication of a PLMN in the communications network, for which the specific functionality is to be performed.

The first NF service provider 121, the receiving unit 903 and/or the processing unit 901 may further be configured to receive the indication of the PLMN as an indication of a PLMN of the CS domain in a legacy radio access of the communications network, for which the specific functionality is to be performed.

The first NF service provider 121, the receiving unit 903 and/or the processing unit 901 may further be configured to receive the request from the NF service consumer 130 wherein the request further comprises an area identifier for identifying the desired network area.

The first NF service provider 121, the determining unit 904 and/or the processing unit 901 may further be configured to determine the address of the one or more second NF service provider 122 supporting the specific functionality for the desired network area by finding one or more second NF service provider 122 which partially match the target network information the PLMN and/or the an area identifier received from the NF service consumer 130, and wherein the first NF service provider 121, the determining unit 904 and/or the processing unit 901 may further be configured to select the one or more second NF service provider 122 which have the most information elements matching the target network information or the PLMN.

The first NF service provider 121, the determining unit 904 and/or the processing unit 901 may further be configured to determine the address of the second NF service provider 122 supporting the specific functionality for the desired network area by finding one or more second NF service provider 122 which match the complete target information and/or the PLMN received from the NF service consumer 130.

The embodiments herein relating to the first NF service provider 121 may be implemented through a respective processor or one or more processors, such as the processing unit 901 of a processing circuitry in the first NF service provider 121 depicted in FIG. 9, together with respective computer program code for performing the functions and actions of the embodiments herein. The program code mentioned above may also be provided as a computer program product, for instance in the form of a data carrier carrying computer program code for performing the embodiments herein when being loaded into the first NF service provider 121. One such carrier may be in the form of a CD ROM disc. It is however feasible with other data carriers such as a memory stick. The computer program code may furthermore be provided as pure program code on a server and downloaded to the first NF service provider 121.

The first NF service provider 121 may further comprise a memory 908. The memory 908 comprises one or more memory units to be used to store data on, such as system information, configurations and/or applications to perform the methods disclosed herein when being executed, and similar.

The methods according to the embodiments described herein for the first NF service provider may respectively be implemented by means of e.g. a computer program 909 or a computer program product, comprising instructions, i.e., software code portions, which, when executed on at least one processor, cause the at least one processor to carry out the actions described herein, as performed by the first NF service provider. The computer program 909 may be stored on a computer-readable storage medium 910, e.g. a disc or similar. The computer-readable storage medium 910, having stored thereon the computer program, may comprise instructions which, when executed on at least one processor, cause the at least one processor to carry out the actions described herein, as performed by the first NF service provider. In some embodiments, the computer-readable storage medium may be a non-transitory computer-readable storage medium.

Figure 10:
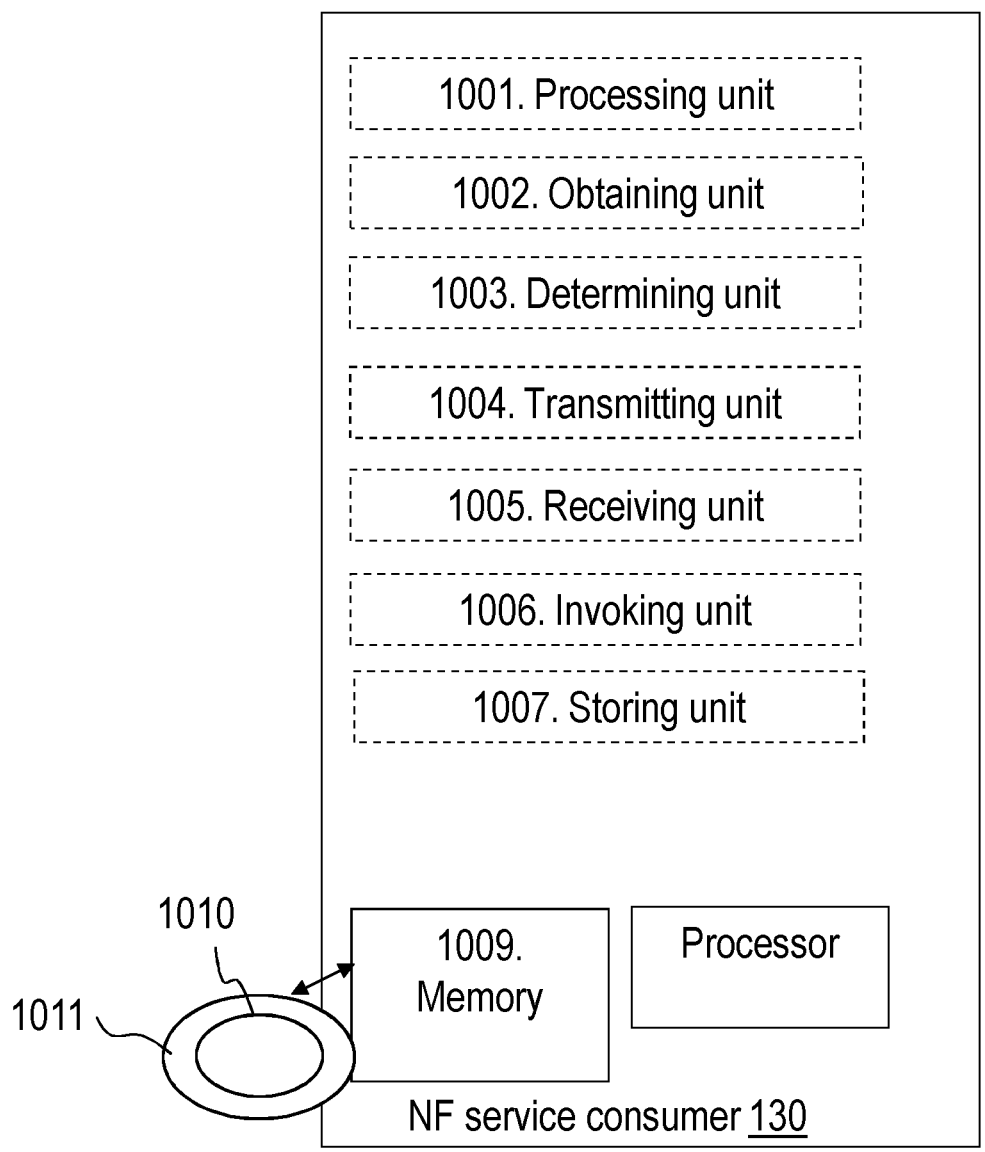
FIG. 10 is a block diagram depicting an NF service consumer according to embodiments herein.

FIG. 10 is a block diagram depicting the NF service consumer 130 in the 5GC, for requesting a specific functionality to be performed for a specific area of the communications network 100. The 5G core network further comprises a first NF service provider 121 for enabling a specific functionality for the specific area and one or more second NF service provider 122 managing the specific functionality for the specific area. The NF Service consumer 130 may be an Access and Mobility Management Function (AMF) located in the 5GC. The NF service consumer 130 may comprise a processing unit 1001, such as e.g. one or more processors, an obtaining unit 1002, a determining unit 1003, a transmitting unit 1004, a receiving unit 1005, an invoking unit 1006, and a storing unit 1007 as exemplifying hardware units configured to perform the methods described herein.

The NF service consumer 130, the obtaining unit 1002 and/or the processing unit 1001 is configured to obtain a request to locate an NF service provider 122 supporting a specific functionality for a specific network area. The request comprises network area information for the area for which the specific functionality is desired to be performed for.

The NF service consumer 130, the determining unit 1003 and/or the processing unit 1001 is further configured to determine, based on the obtained information, that the NF service consumer 130 does not have information regarding a second NF service provider 122 managing the specific functionality configured or associated to the obtained network area information.

The NF service consumer 130, the transmitting unit 1004 and/or the processing unit 1001 is further configured to transmit to the first NF service provider 121 enabling the specific functionality for the specific area, a request for an address of the one or more second NF service provider 122 managing the specific functionality for the specific area, wherein the request comprises a target network information indicating the network area in which the specific functionality shall be performed.

The NF service consumer 130, the receiving unit 1005 and/or the processing unit 1001 is further configured to receive, from the first NF service provider 121, an address of one or more second NF service provider 122 supporting the specific functionality for the indicated network area, which has been determined the first NF service provider based on the target network information comprised in the transmitted request.

The NF service consumer 130, the invoking unit 1006, the transmitting unit 1004 and/or the processing unit 1001 may further be configured to invoke the specific functionality by transmitting a message to one of the one or more second NF service provider 122 based on the received address. The message may comprise an indication that the specific functionality is to be performed and an indication of the specific network area for which the specific functionality is to be performed.

The NF service consumer 130, the storing unit 1007, such as the memory 1009 and/or the processing unit 1001 may further be configured to store the received address of the second NF service provider 122 supporting the specific functionality for the specific network area determined based on the target network information comprised in the transmitted request, and associating the target network information to the received address.

The NF service consumer 130, the transmitting unit 1004 and/or the processing unit 1001 may further be configured to transmit the request to the first NF service provider 121 further comprising an indication of a PLMN in the radio access of the communications network, for which the specific functionality is to be performed.

The NF service consumer 130, the transmitting unit 1004 and/or the processing unit 1001 may further be configured to transmit the indication of the PLMN as an indication of a PLMN of the CS domain in a legacy radio access of the communications network, which the specific functionality is to be performed for.

The NF service consumer 130, the transmitting unit 1004 and/or the processing unit 1001 may further be configured to transmit the request to the first NF service provider 121 further comprising an area identifier for identifying the desired network area.

In one embodiment herein the specific functionality may be a Single Radio Voice Call Continuity (SRVCC) handover for a UE 110 having a voice session anchored in an IMS 150 in a PS domain in the 5GC and in the 5G RAN, which may also be referred to as a NG-RAN. The specific area may be a CS domain of a legacy core network and/or radio access network. Hence, the SRVCC handover may move the voice session to a CS domain in a legacy core network and radio access in a communications network. In this embodiment, the NF service consumer 130, the obtaining unit 1002 and/or the processing unit 901 may be configured to obtain, from a node in the 5G radio access network 140, a message comprising an indication that an SRVCC is to be prepared for the specific area of the communications network and a target network information of the specific area of the communications network, wherein the target network information indicates where in the legacy core network the second NF service provider 122, such as the SRVCCF, should forward the handover to.

The embodiments herein relating to the NF service consumer 130 may be implemented through a respective processor or one or more processors, such as the processing unit 1001 of a processing circuitry in the NF service consumer 130 depicted in FIG. 10, together with respective computer program code for performing the functions and actions of the embodiments herein. The program code mentioned above may also be provided as a computer program product, for instance in the form of a data carrier carrying computer program code for performing the embodiments herein when being loaded into the NF service consumer 130. One such carrier may be in the form of a CD ROM disc. It is however feasible with other data carriers such as a memory stick. The computer program code may furthermore be provided as pure program code on a server and downloaded to the NF service consumer 130.

The NF service consumer 130 may further comprise a memory 1009. The memory 1009 may comprise one or more memory units to be used to store data on, such as system information, configurations and/or applications to perform the methods disclosed herein when being executed, and similar.

The methods according to the embodiments described herein for the NF service provider may respectively be implemented by means of e.g. a computer program 1010 or a computer program product, comprising instructions, i.e., software code portions, which, when executed on at least one processor, cause the at least one processor to carry out the actions described herein, as performed by the NF service consumer. The computer program 1010 may be stored on a computer-readable storage medium 1011, e.g. a disc or similar. The computer-readable storage medium 1010, having stored thereon the computer program, may comprise instructions which, when executed on at least one processor, cause the at least one processor to carry out the actions described herein, as performed by the NF service consumer. In some embodiments, the computer-readable storage medium may be a non-transitory computer-readable storage medium.

Figure 11:
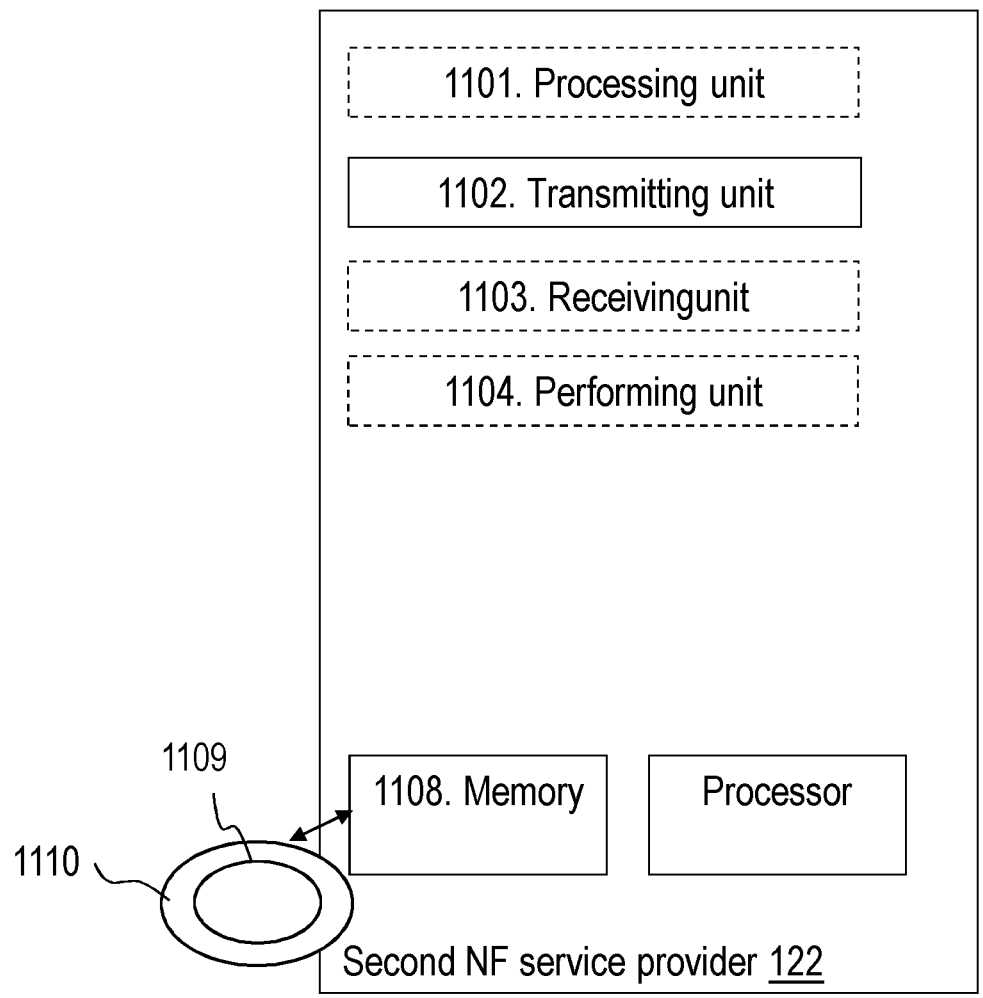
FIG. 11 is a block diagram depicting a second NF service provider according to embodiments herein.

FIG. 11 is a block diagram depicting the second NF service provider 122 in the 5GC, for managing a specific functionality for a specific area of the communications network 100. The 5GC further comprises a first NF service provider 121 for enabling a specific functionality for the specific area and an NF service consumer 130 requesting the specific functionality to be performed by the second NF service provider 122 for the specific area. The second NF Service provider 122 may be a Single Radio Voice Call Continuity Function (SRVCCF) located in the 5GC. In some embodiments, the specific functionality may be an SRVCC handover for a UE 110 having a voice session anchored in an IMS 150 in a PS domain in the 5G core network and in a 5G radio access network, wherein the SRVCC handover moves the voice session to a CS domain in a legacy core network and radio access in a communications network. In some embodiments the specific area may be related to a CS domain of a legacy core network and/or radio access network. The second NF service provider 122 may comprise a processing unit 1101, such as e.g. one or more processors, a transmitting unit 1102, a receiving unit 1103, and a performing unit 1104 as exemplifying hardware units configured to perform the methods described herein.

The second NF service provider 122, the transmitting unit 1102 and/or the processing unit 1101 is configured to transmit, to the first NF service provider 121 enabling the specific functionality to be performed, information regarding the specific functionality which the second NF service provider 122 supports, the network areas for which the second NF service provider 122 supports the specific functionality and information regarding the address of the second NF service provider 122.

The second NF service provider 122, the receiving unit 1103 and/or the processing unit 1101 may be configured to receive a confirmation from the first NF service provider 121, which confirmation confirms that the transmitted information regarding the specific functionality which the second NF service provider 122 supports, the network areas for which the second NF service provider 122 supports the specific functionality and information regarding the address of the second NF service provider 122 has been received.

The second NF service provider 122, the receiving unit 1103 and/or the processing unit 1101 may be configured to receive, from the NF service consumer 120, a first indication, which first indication indicates that the specific functionality is to be performed, and a second indication, which second indication indicates the specific network area in which the specific functionality is to be performed.

The second NF service provider 122, the performing unit 1104 and/or the processing unit 1101 may further be configured to perform the specific functionality indicated by the first indication received from the NF service consumer 130 in the specific network area indicated by the second indication received from the NF service consumer 130.

In some embodiments the specific functionality may be an SRVCC handover for a UE 110 having a voice session anchored in the IMS in a PS domain in the 5GC and in the 5G RAN, which may also be referred to as the NG-RAN. The specific area may be a CS domain of a legacy core network and/or radio access network. Hence, the SRVCC handover may move the voice session to a CS domain in a legacy core network and radio access in the communications network 100.

The embodiments herein relating to the second NF service provider 122 may be implemented through a respective processor or one or more processors, such as the processing unit 1101 of a processing circuitry in the second NF service provider 122 depicted in FIG. 11, together with respective computer program code for performing the functions and actions of the embodiments herein. The program code mentioned above may also be provided as a computer program product, for instance in the form of a data carrier carrying computer program code for performing the embodiments herein when being loaded into the second NF service provider 122. One such carrier may be in the form of a CD ROM disc. It is however feasible with other data carriers such as a memory stick. The computer program code may furthermore be provided as pure program code on a server and downloaded to the second NF service provider 122.

The second NF service provider 122 may further comprise a memory 1108. The memory 1108 may comprise one or more memory units to be used to store data on, such as system information, configurations and/or applications to perform the methods disclosed herein when being executed, and similar.

The methods according to the embodiments described herein for the second NF service provider may respectively be implemented by means of e.g. a computer program 1109 or a computer program product, comprising instructions, i.e., software code portions, which, when executed on at least one processor, cause the at least one processor to carry out the actions described herein, as performed by the second NF service provider. The computer program 1109 may be stored on a computer-readable storage medium 1110, e.g. a disc or similar. The computer-readable storage medium 1110, having stored thereon the computer program, may comprise instructions which, when executed on at least one processor, cause the at least one processor to carry out the actions described herein, as performed by the first NF service provider. In some embodiments, the computer-readable storage medium may be a non-transitory computer-readable storage medium.

As will be readily understood by those familiar with communications design, that functions means or units may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of network nodes will appreciate the cost, performance, and maintenance trade-offs inherent in these design choices.

When using the word "comprise" or "comprising" it shall be interpreted as non-limiting, i.e. meaning "consist at least of". When using the word "set" herein, it shall be interpreted as meaning "one or more".

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a first Network Function (NF) service provider, which is a Network Repository Function (NRF), in a 5G core network for enabling a specific functionality for a specific area of a 5G communications network managed by a second NF service provider, which is a Single Radio Voice Call Continuity Function (SRVCCF), to transfer a voice session from the 5G communications network to a legacy 2G or 3G communications network, wherein the method comprises:
  obtaining, from a plurality of second NF service providers that are SRVCCFs, respective information regarding specific functionality for a specific area supported by each respective SRVCCF to enable the transfer of the voice session from the 5G communications network to a legacy 2G or 3G communications network, and information regarding an address of each of the SRVCCFs;
  receiving, from a NF service consumer, which is an Access and Mobility Management Function (AMF) located in the 5G core network, a request for an address of one or more SRVCCF supporting a specific functionality for a desired network area, wherein the request comprises a network area information, to transfer the voice session from the 5G communications network to the legacy 2G or 3G communications network;
  determining, based on the received network area information from the AMF, address of the one or more SRVCCF, from the plurality of SRVCCFs, supporting the specific functionality for the network area indicated in the received request, wherein the determining the address of the one or more SRVCCF supporting the specific functionality for the desired network area includes finding one or more SRVCCF which partially match the network area information, a Public Land Mobile Network (PLMN) received from the AMF, or both the one or more SRVCCF which partially match the network area information and the PLMN received from the NF service consumer; and
  sending, to the AMF, the address of the one or more SRVCCF supporting the specific functionality for the network area indicated in the received request.

2. The method according to claim 1, wherein the request received from the AMF further comprises an indication of the PLMN in the 5G communications network, which the specific functionality is to be performed for.

3. The method according to claim 2, wherein the indication of the PLMN is an indication of a PLMN of a circuit switched (CS) domain in a legacy core network and legacy radio access network of the 2G or 3G communications network.

4. The method according to claim 1, wherein the request received from the AMF further comprises an area identifier for identifying the desired network area, wherein the area identifier is a Tracking Area Identity (TAI), a Location Area Identification (LAI), a Routing Area Identity (RAI), a Radio Access Network (RAN) node identity or a cell-identity.

5. The method according to claim 1, wherein the determining the address of the one or more SRVCCF supporting the specific functionality for the desired network area comprises finding one or more SRVCCF which match a complete network area information, the PLMN received from the AMF, or both the complete network area information and the PLMN received from the AMF.

6. The method according to claim 1, wherein the specific functionality is a Single Radio Voice Call Continuity (SRVCC) handover for a User Equipment (UE) having a voice session anchored in an IP-Multimedia Subsystem (IMS) in a packet switched (PS) domain in the 5G core network and in a 5G radio access network, wherein the SRVCC handover moves the voice session to a circuit switched (CS) domain in a legacy core network and legacy radio access network of the 2G or 3G communications network.

7. The method according to claim 1, wherein the specific area is related to a circuit switched (CS) domain of a legacy core network, radio access network, or both the legacy core network and the radio access network, of the 2G or 3G communications network.

8. A first Network Function (NF) service provider, which is a Network Repository Function (NRF), in a 5G core network for enabling a specific functionality for a specific area of a 5G communications network managed by a second NF service provider, which is a Single Radio Voice Call Continuity Function (SRVCCF), to transfer a voice session from the 5G communications network to a legacy 2G or 3G communications network, wherein the NRF is configured to:
  obtain, from a plurality of second NF service providers that are SRVCCFs, respective information regarding specific functionality for a specific area supported by each respective SRVCCF to enable the transfer of the voice session from the 5G communications network to a legacy 2G or 3G communications network, and information regarding an address of each of the SRVCCFs;
  receive, from a NF service consumer, which is an Access and Mobility Management Function (AMF) located in the 5G core network, a request for an address of one or more SRVCCF supporting a specific functionality for a desired network area, wherein the request comprises a network area information to transfer the voice session from the 5G communications network to the legacy 2G or 3G communications network;

determine, based on the received network area information from the AMF, address of the one or more SRVCCF, from the plurality of SRVCCFs, supporting the specific functionality for the network area indicated in the received request, wherein the determination of the address of the one or more SRVCCF supporting the specific functionality for the desired network area includes finding one or more SRVCCF which partially match the network area information, a Public Land Mobile Network (PLMN) received from the AMF, or both the one or more SRVCCF which partially match the network area information and the PLMN received from the NF service consumer; and send, to the AMF, the address of the one or more SRVCCF supporting the specific functionality for the network area indicated in the received request.

9. The first NF service provider according to claim 8, wherein the request received from the AMF further comprises an indication of the PLMN in the 5G communications network, which the specific functionality is to be performed for.

10. The first NF service provider according to claim 9, wherein the indication of the PLMN is an indication of a PLMN of a circuit switched (CS) domain in a legacy core network and legacy radio access network of the 2G or 3G communications network.

11. The first NF service provider according to claim 8, wherein the request received from the AMF further comprises an area identifier for identifying the desired network area, wherein the area identifier is a Tracking Area Identity (TAI), a Location Area Identification (LAI), a Routing Area Identity (RAI), a Radio Access network (RAN) node identity or a cell-identity.

12. The first NF service provider according to claim 8, further configured to determine the address of the one or more SRVCCF supporting the specific functionality for the desired network area by finding one or more SRVCCF which match a complete target information, the PLMN received from the AMF, or both the complete target information and the PLMN received from the AMF.

13. The first NF service provider according to claim 8, wherein the specific functionality is a Single Radio Voice Call Continuity (SRVCC) handover for a User Equipment (UE) having a voice session anchored in an IP-Multimedia Subsystem (IMS) in a packet switched (PS) domain in the 5G core network and in a 5G radio access network, wherein the SRVCC handover moves the voice session to a circuit switched (CS) domain in a legacy core network and radio access of the 2G or 3G communications network.

14. The first NF service provider according to claim 8, wherein the specific area is related to a circuit switched (CS) domain of a legacy core network, radio access network, or both the legacy core network and the radio access network, of the 2G or 3G communications network.

\* \* \* \* \*